(12) United States Patent
Saigo

(10) Patent No.: US 11,438,559 B2
(45) Date of Patent: Sep. 6, 2022

(54) IMAGE CORRECTION METHOD AND PROJECTOR

(71) Applicant: SEIKO EPSON CORPORATION, Tokyo (JP)

(72) Inventor: Manabu Saigo, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/388,063

(22) Filed: Jul. 29, 2021

(65) Prior Publication Data

US 2022/0038670 A1    Feb. 3, 2022

(30) Foreign Application Priority Data

Jul. 29, 2020  (JP) .............................. JP2020-127973

(51) Int. Cl.
*H04N 9/31*      (2006.01)

(52) U.S. Cl.
CPC ......... *H04N 9/3185* (2013.01); *H04N 9/3147* (2013.01); *H04N 9/3155* (2013.01); *H04N 9/3197* (2013.01)

(58) Field of Classification Search
CPC ...... H04N 9/3185; H04N 9/3147; H04N 9/31; H04N 9/3188; H04N 9/317; H04N 9/3155; H04N 9/3197; G03B 21/147; G06T 7/30; G06T 5/006; G03F 7/70258
USPC ................ 348/745–747, 806, 807
See application file for complete search history.

(56) References Cited

U.S. PATENT DOCUMENTS

| | | |
|---|---|---|
| 2004/0207819 A1 | 10/2004 | Moriwaki et al. |
| 2020/0077061 A1 | 3/2020 | Ota et al. |
| 2021/0025699 A1* | 1/2021 | Shishido .............. H04N 9/3194 |

FOREIGN PATENT DOCUMENTS

| | | |
|---|---|---|
| JP | 2004-320661 A | 11/2004 |
| JP | 2020-36141 A | 3/2020 |

* cited by examiner

*Primary Examiner* — Sherrie Hsia
(74) *Attorney, Agent, or Firm* — Dority & Manning, P.A.

(57) ABSTRACT

An image correction method performed by a projector, the method including projecting a second image onto a projection surface, the second image is acquired by reducing a first image containing a plurality of candidate points that are candidates for display position correction to a size that falls within a projection area that is the largest area over which the projector is capable of projection, accepting a first input to select a target point that is a display position correction target out of the plurality of candidate points in the state in which the second image is projected on the projection surface, projecting a third image onto the projection surface, the third image is acquired by enlarging the second image to the size of the first image after accepting the first input, accepting a second input to change the display position of the target point in the state in which the third image is projected on the projection surface, and projecting a projection image acquired by correcting the shape of an input image based on the second input onto the projection surface.

7 Claims, 15 Drawing Sheets

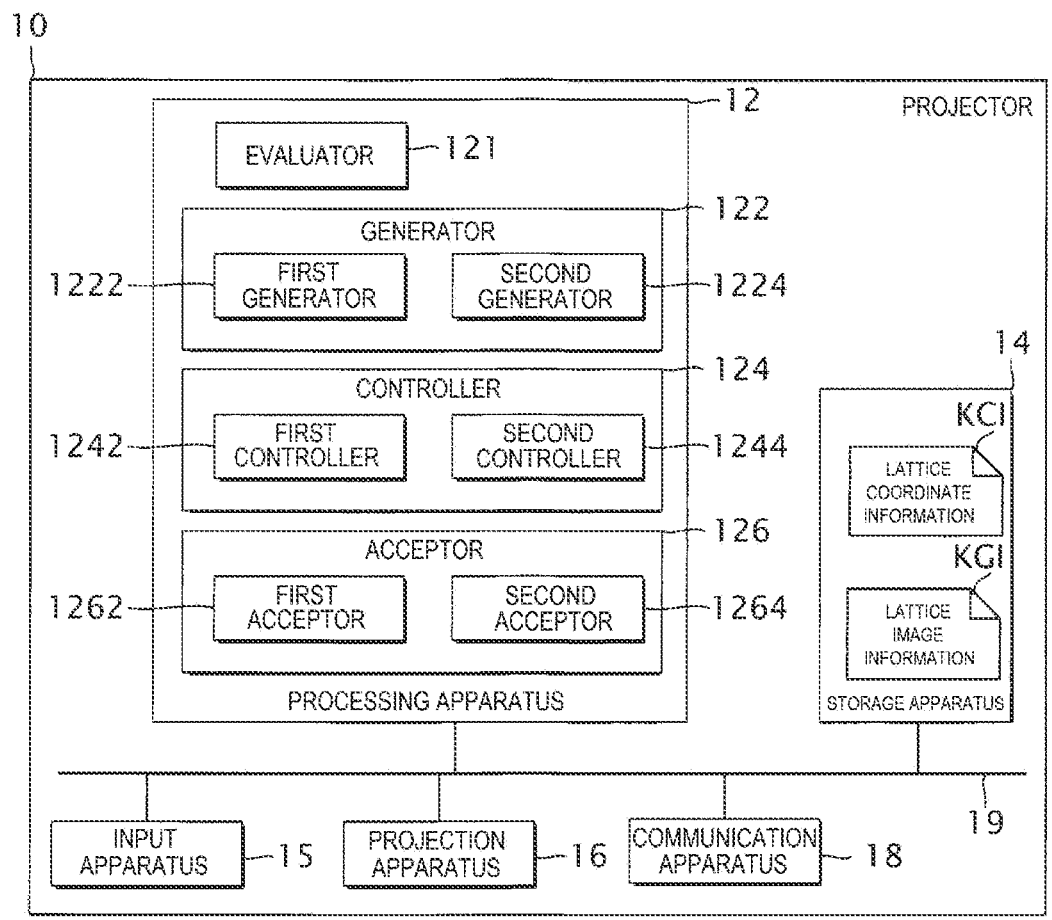
FIG. 4
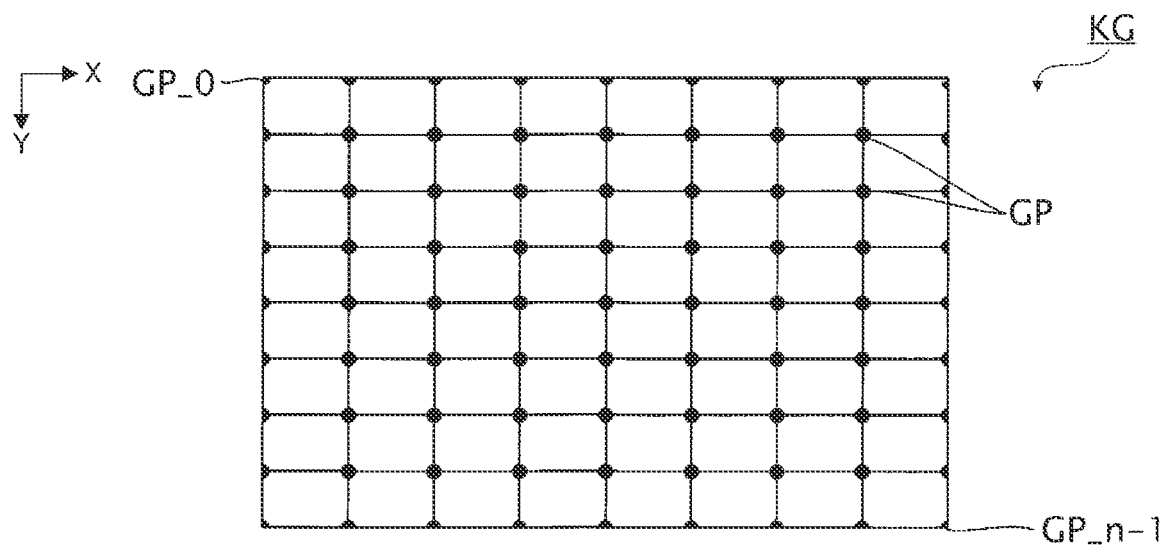

| LATTICE POINT IDENTIFICATION INFORMATION | COORDINATE INFORMATION | |
|---|---|---|
| GP_0 | (0,0) | — KCIR_0 |
| ... | ... | |
| GP_n-1 | (1279,799) | — KCIR_n-1 |

KCI

| LATTICE POINT IDENTIFICATION INFORMATION | COORDINATE INFORMATION | |
|---|---|---|
| GP_0 | (0,0) | — KCIR_0 |
| ... | ... | |
| GP_i | (gp_ix,-40) | — KCIR_i |
| ... | ... | |
| GP_j | (-160,gp_jy) | — KCIR_j |
| ... | ... | |
| GP_n-1 | (1279,799) | — KCIR_n-1 |

KCI

IMAGE CORRECTION METHOD AND PROJECTOR

The present application is based on, and claims priority from JP Application Serial Number 2020-127973, filed Jul. 29, 2020, the disclosure of which is hereby incorporated by reference herein in its entirety.

BACKGROUND

1. Technical Field

The present disclosure relates to an image correction method and a projector.

2. Related Art

There has been a proposed projector that projects a projection image resulting from correction of the shape of an input image onto a projection surface. For example, JP-A-2004-320661 discloses a system that displays an auxiliary line on a user interface screen of a computer coupled to a projector and corrects the shape of the projection image by allowing a user to deform the shape of the auxiliary line. When the auxiliary line extends off the display range of a display, the system reduces the area of the user interface screen to display the extending-off auxiliary extension line.

However, since the system of the related art needs to use a computer, the shape of an input image cannot be corrected only by the projector. It is now assumed that when part of the input image is located outside a projection area that is the largest area over which the projector can perform projection, the projector reduces the entire image including the auxiliary line so that the reduced image falls within the projection area and projects the reduced image containing the auxiliary line onto the projection surface. According to the method described above, the shape of the image including the auxiliary line before the reduction differs from the shape after the reduction. It is therefore difficult to correct the shape of the input image to a desired shape in accordance with the state of the projection surface.

SUMMARY

An image correction method according to an aspect of the present disclosure is an image correction method performed by a projector, the method including reducing a first image containing a plurality of candidate points that are candidates for display position correction to a second image having a size that falls within a projection area that is a largest area over which the projector is capable of projection and projecting the second image onto a projection surface, accepting a first input of selection of a target point that is a display position correction target out of the plurality of candidate points in a state in which the second image is projected on the projection surface, enlarging the second image to a third image having a size of the first image after accepting the first input and projecting the third image onto the projection surface, accepting a second input of a change in a display position of the target point in a state in which the third image is projected on the projection surface, and correcting a shape of an input image based on the second input to generate a projection image and projecting the projection image onto the projection surface.

A projector according to another aspect of the present disclosure is a projector including a light source that outputs light, a light modulator that modulates the light to generate modulated light, a lens that outputs the modulated light, and at least one processing apparatus, and the at least one processing apparatus reduces a first image containing a plurality of candidate points that are candidates for display position correction to a second image so sized that an outer circumference of the first image falls within a projection area that is a largest area over which the projector is capable of projection and projects the second image onto a projection surface by controlling the light modulator, accepts a first input of selection of a target point that is a display position correction target out of the plurality of candidate points in a state in which the second image is projected on the projection surface, enlarges the second image to a third image having a size of the first image after accepting the first input and projects the third image onto the projection surface by controlling the light modulator, accepts a second input of a change in a display position of the target point in a state in which the third image is projected on the projection surface, and corrects a shape of an input image based on the second input to generate a projection image and projects the projection image onto the projection surface by controlling the light modulator.

BRIEF DESCRIPTION OF THE DRAWINGS

FIG. 3 shows the configuration of a projector.
FIG. 4 shows an example of a lattice image in an initial state.

DESCRIPTION OF EXEMPLARY EMBODIMENTS

Figure 1:
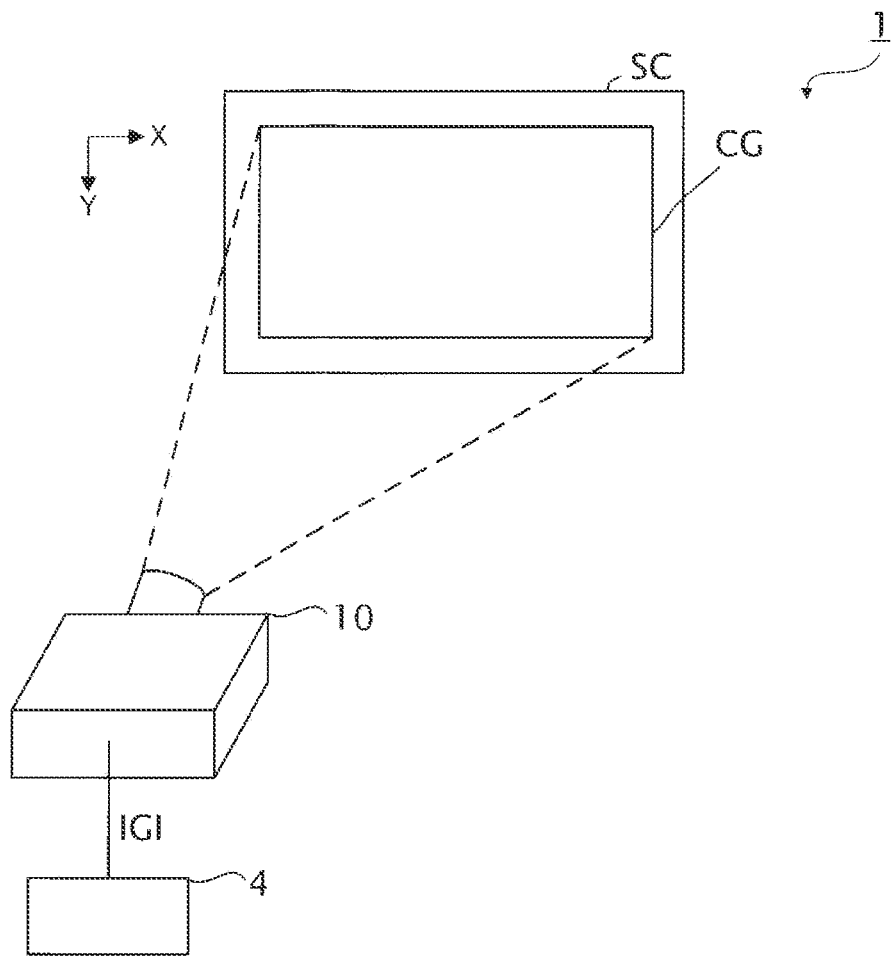
FIG. 1 shows a display system.

Forms for implementing the present disclosure will be described below with reference to the drawings. It is, however, noted that the dimension and scale of each portion in the drawings differ from actual values as appropriate. The embodiment described below is a preferable specific example of the present disclosure, and a variety of technically preferable restrictions are therefore imposed on the embodiment described below. The scope of the present disclosure is, however, not limited to the forms unless the following description states that particular restrictions are imposed on the present disclosure.

1. Embodiment

A display system 1 according to the present embodiment will be described.

1.1. Overview of Display System 1

FIG. 1 shows the display system 1. The display system 1 includes an image provider 4 and a projector 10. The present embodiment will be described with reference to a case where the projector 10 can correct the shape of an image to be projected without using the screen of the computer but based on operation performed by a user who uses the projector 10.

The image provider 4 provides the projector 10 with input image information IGI representing an input image IG. The projector 10 performs geometry correction on the input image information IGI to generate projection image information CGI resulting from correction of the shape of the input image IG and projects a projection image CG indicated by the projection image information CGI onto a projection surface SC. The projection image information CGI is an example of "image information representing a projection image". The image provider 4 is an apparatus including a communication apparatus that outputs image information to the projector 10, and the communication apparatus is, for example, a smartphone, a personal computer, and a USB (universal serial bus) memory. The projection image information CGI may be stored in a storage apparatus 14 of the projector 10. In this case, the image provider 4 may not be provided.

Axes X and Y shown in FIG. 1 are perpendicular to each other. The axes X and Y are parallel to the projection surface SC. In the example shown in FIG. 1, out of the two directions along the axis X, the rightward direction viewed in the direction facing the projection surface SC is called a direction +X, and the leftward direction viewed in the direction facing the projection surface SC is called a direction −X. The directions +X and −X are collectively called lengthwise or a lengthwise direction in some cases in the following description. Similarly, out of the two directions along the axis Y, the downward direction in FIG. 1 is called a direction +Y, and the upward direction in FIG. 1 is called a direction −Y. The directions +Y and −Y are collectively called widthwise in some cases in the following description.

Figure 2:
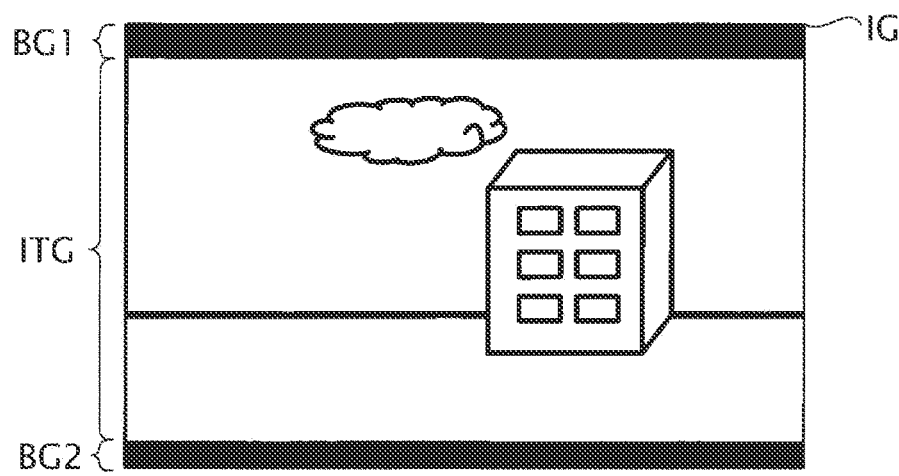
FIG. 2 shows an example of an input image.

The geometric correction is the process of geometrically correcting the shape of an image. Distortion of the image can be corrected by performing the geometric correction. Image distortion occurs in the following two situations: A first situation is a case where the projection surface SC is a curved surface or the projection surface SC has irregularities; and a second situation is a case where the projector 10 performs projection from a position that is not located in front of the projection surface SC. Further, the geometry correction can also be used to prevent display of a portion that the user does not desire to display out of the input image IG. FIG. 2 shows an example of the input image IG including a portion that the user does not desire to display.

FIG. 2 shows an example of the input image IG. The input image IG includes a display target image ITG, which the user desires to display, as shown in FIG. 2. The input image IG further includes a strip-shaped black image BG1, which is added to the top of the display target image ITG, and a strip-shaped black image BG2, which is added to the bottom of the display target image ITG. The black images BG1 and BG2 are images that the user does not desire to display. The state in which strip-shaped black images are added to the top and bottom of an image is referred to as a letterbox in some cases.

Performing the geometric correction to correct the shape of the input image IG so that only the display target image ITG is displayed in a projection area PA allows the projector 10 not to display the black image BG1 or BG2 on the projection surface SC. The projection area PA is the largest area over which the projector 10 can perform projection. The projection surface SC has a sufficiently larger area than the projection area PA. The projection area PA has a rectangular shape. It is, however, noted that the projection area PA does not necessarily have a rectangular shape and may have, for example, a parallelogram or circular shape.

1.2. Configuration of Projector 10

FIG. 3 shows the configuration of the projector 10. The projector 10 includes at least one processing apparatus 12, the storage apparatus 14, an input apparatus 15, a projection apparatus 16, and a communication apparatus 18. The elements of the projector 10 are coupled to each other via a bus 19 for information communication.

The processing apparatus 12 is a computer, such as a CPU. CPU is an abbreviation for a central processing unit. The processing apparatus 12 may be formed of one or more processors.

Figures 5, 6, 7:
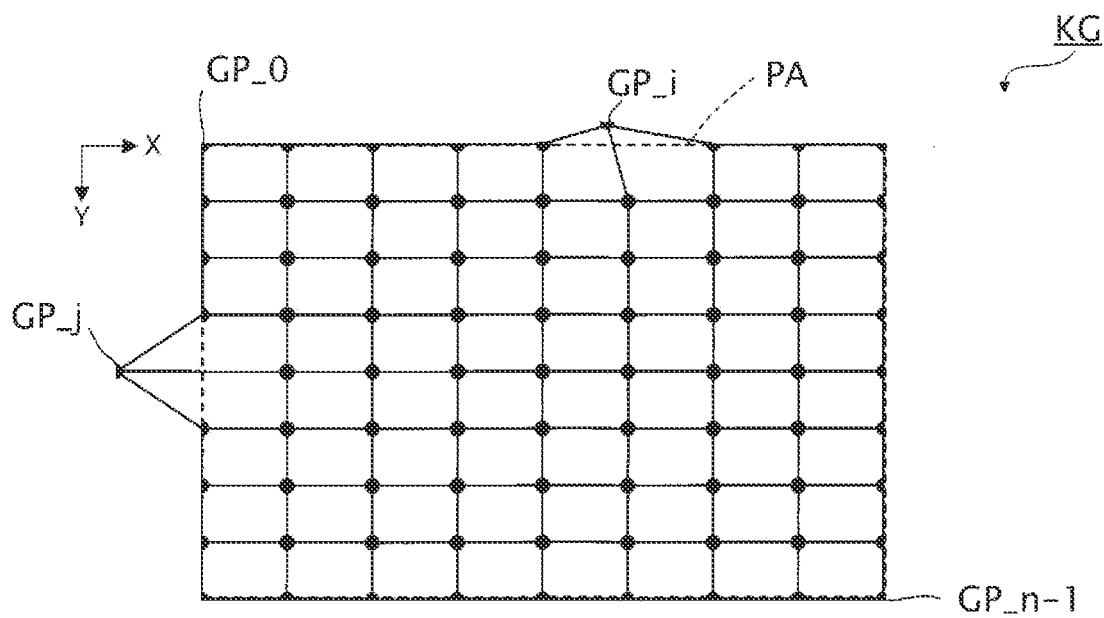
FIG. 5 shows an example of the stored content of lattice coordinate information in an initial state.
FIG. 6 shows an example of the lattice image after updated.
FIG. 7 shows an example of the stored content of the lattice coordinate information after updated.

The storage apparatus 14 is formed, for example, of a magnetic storage apparatus or a flash ROM (read only memory). The storage apparatus 14 is a recording medium readable by the processing apparatus 12 and stores, for example, a plurality of programs including a control program executed by the processing apparatus 12, lattice image information KGI representing a lattice image KG, lattice coordinate information KCI, and a variety of pieces of information used by the processing apparatus 12. The lattice image KG is an example of a "first image". The lattice image KG contains a plurality of lattice points GP. The plurality of lattice points GP are candidates for target points TP, which are targets to be corrected in terms of display position. The lattice coordinate information KCI represents the coordinates of each of the plurality of lattice points GP contained in the lattice image KG. The coordinates are coordinates in a plane XY containing the projection area PA. The shape of the lattice image KG is subject to be changed by the user's operation. The lattice coordinate information KCI is updated in accordance with a change in the lattice image KG. FIGS. 4 and 5 show an example of the lattice image KG in an initial state, and FIGS. 6 and 7 show an example of the lattice image KG after updated.

FIG. 4 shows an example of the lattice image KG in the initial state. The lattice image KG contains a plurality of lattice points GP. The lattice points GP are each an example of a "candidate point". The lattice image KG shown in FIG. 4 contains line segments each connecting the lattice points GP adjacent to each other along the axis X or Y. The lattice image KG may contain no line segments each connecting adjacent lattice points GP. It is assumed in the following description that the lattice image KG contains the lattice points GP and the line segments each connecting the lattice points GP adjacent to each other along the axis X or Y. In FIG. 4, the reference character is displayed only at part of the plurality of lattice points GP to avoid complication. The lattice image KG in the initial state substantially coincides with the projection area PA in terms of size. A lattice point GP_0 contained in the lattice image KG shown in FIG. 4 by way of example is located at the upper left vertex of the lattice image KG, and a lattice point GP_n−1 contained in the lattice image KG is located at the lower right vertex of the lattice image KG. The following description uses reference characters to distinguish elements of the same kind from each other, such as the lattice point GP_0 and the lattice point GP_n−1. On the other hand, only the common reference character, such as the lattice points GP, is used when the elements of the same kind are not distinguished from each other. The symbol n is an integer greater than or equal to one according to the size of the projection area PA and the interval between the adjacent lattice points GP. The following description will be made of a case where the projection area PA has 1280 pixels in the widthwise direction and 800 pixels in the lengthwise direction. For example, when the interval between the lattice points GP adjacent in the widthwise direction corresponds to 160 pixels, and the interval between the lattice points GP adjacent in the lengthwise direction corresponds to 100 pixels, the number of lattice points GP arranged in the widthwise direction is (1280÷160)+1=9, and the number of lattice points GP arranged in the lengthwise direction is (800÷100)+1=9. Therefore, n is 9×9=81.

FIG. 5 shows an example of the content of the lattice coordinate information KCI in the initial state stored in the storage 14. The lattice coordinate information KCI is information that associates lattice point identification information for identification of the lattice points GP and coordinate information representing the coordinates of each of the lattice points GP. The lattice coordinate information KCI has n records. A record KCIR_0 shows that the coordinates of the lattice point GP_0 is (0, 0), as shown in FIG. 5. A record KCIR_n−1 shows that the coordinates of the lattice point GP_n−1 is (1279, 799).

FIG. 6 shows an example of the lattice image KG after updated. FIG. 6 shows the lattice image KG after the lattice image KG in the initial state is updated in terms of the positions of lattice points GP_i and GP_j. FIG. 6 further shows the projection area PA drawn with the dashed line to show the positional relationship between the updated lattice image KG and the projection area PA. In practice, the lattice image KG needs to contain no frame representing the projection area PA. The lattice points GP_i and GP_j contained in the lattice image KG shown in FIG. 6 by way of example are located outside the projection area PA. Symbols i and j are each an integer ranging from 0 to n−1.

FIG. 7 shows an example of the stored content of the lattice coordinate information KCI after updated. A record KCIR_i shown in FIG. 7 shows that the coordinates of the lattice point GP_i are (gp_iX, −40) and a record KCIR_j shown in FIG. 7 shows that the coordinates of the lattice point GP_j are (−160, gp_jy). Symbol gp_ix is an integer ranging from 0 to 1279. Symbol gp_jy is an integer ranging from 0 to 799. A lattice point GP may thus be located outside the projection area PA.

The description will be resumed with reference to FIG. 3. The input apparatus 15 is an instrument that allows the user to input information. The input apparatus 15 is formed of a plurality of buttons including, for example, a function list display key, an upward key, a downward key, a rightward key, a leftward key, a finalization key, and a cancel key. The upward, downward, rightward, and leftward keys are collectively referred to as directional keys. The input apparatus 15 may instead be formed of one or more types of apparatus, such as a pointing device and a touch panel. The projector 10 may instead communicate with a remote control including the plurality of buttons described above in place of the input apparatus 15. The following description will be made on the assumption that the input apparatus 15 is formed of the plurality of buttons including the function list display key, the directional keys, the finalization key, and the cancel key.

The projection apparatus 16 projects the projection image CG on the projection surface SC. The projection image CG has a size that falls within the projection area PA. The configuration of the projection apparatus 16 will be described with reference to FIG. 8.

Figure 8:
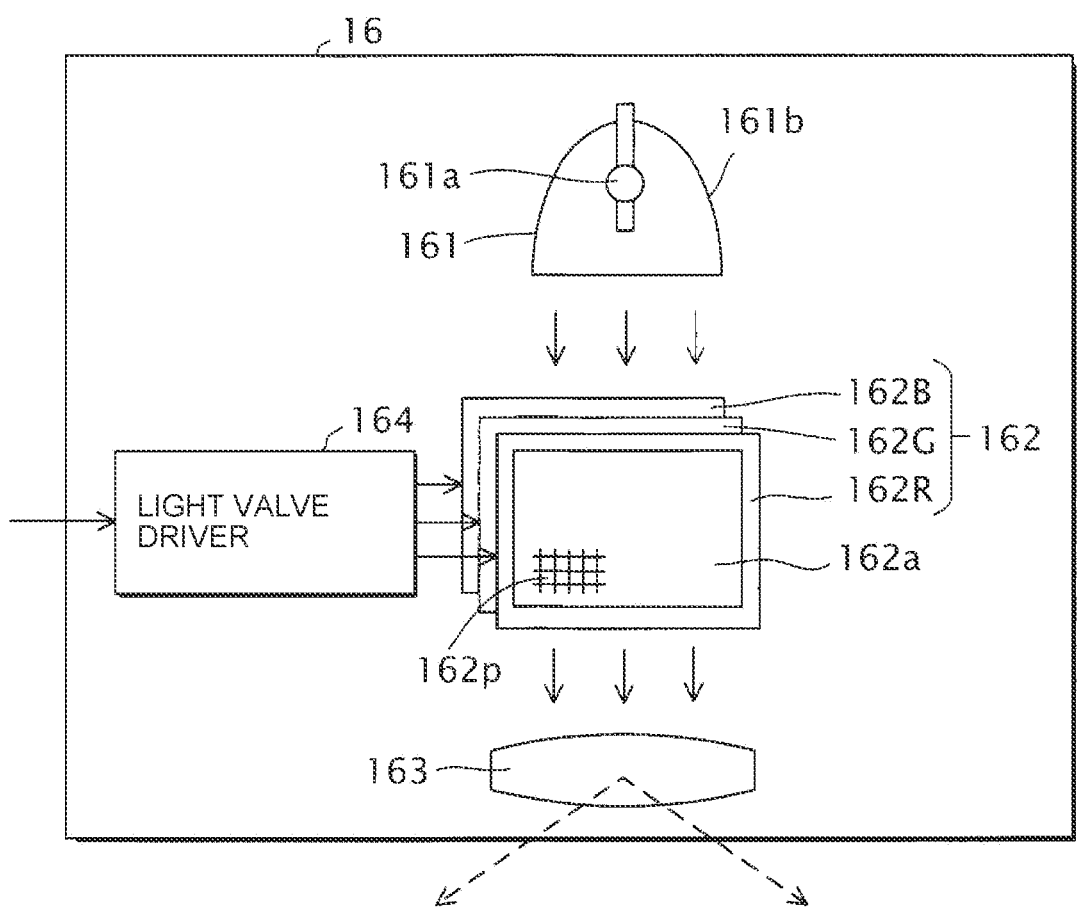
FIG. 8 shows an example of a projection apparatus.

FIG. 8 shows an example of the projection apparatus 16. The projection apparatus 16 includes a light source 161, three liquid crystal light valves 162R, 162G, and 162B, which are an example of a light modulator, a lens 163, which is an example of a projection optical system, a light valve driver 164, and other components. The projection apparatus 16 modulates the light outputted from the light source 161 by using the liquid crystal light valves 162 under the control of the processing apparatus 12 to generate modulated light and enlarges and projects the projection image CG via the lens 163. The resultant image is displayed on the projection surface SC.

The light source 161 includes a light source section 161a, which is formed of a xenon lamp, an ultrahigh-pressure mercury lamp, an LED (light emitting diode), or a laser light source, and a reflector 161b, which reduces variation in the direction of the light outputted by the light source section 161a. The light outputted from the light source 161 has a luminance distribution having variation reduced by an optical integration system that is not shown, and a color separation system that is not shown separates the resultant light into red, green, and blue color light components, which form the three primary colors of light. The color light components of red, green and blue are incident on the liquid crystal light valves 162R, 162G, 162B, respectively.

The liquid crystal light valves 162 are each formed, for example, of a liquid crystal panel including a liquid crystal material encapsulated between a pair of transparent substrates. The liquid crystal light valves 162 each have a rectangular pixel area 162a formed of a plurality of pixels 162p arranged in a matrix. In each of the liquid crystal light valves 162, drive voltage is applicable to the liquid crystal material for each of the pixels 162p. When the light valve driver 164 applies drive voltage according to the projection image information CGI to each of the pixels 162p, the pixel 162p provides optical transmittance set in according with the projection image information CGI. The light outputted from the light source 161 is thus modulated when passing through the pixel areas 162a, and the projection image CG to be projected on the projection surface SC is formed on a color light basis. The size of the projection area PA depends on the size of the pixel areas 162a.

The description will be resumed with reference to FIG. 3. The communication apparatus 18 is hardware that includes a communication circuit that communicates with other apparatuses, such as the image provider 4 and the remote control, via a communication network. The communication apparatus 18 may include a connector or an antenna and a communication circuit compliant with a communication standard, for example, wireless communication via Wi-Fi (registered trademark), Ethernet (registered trademark), IEEE 1394, HDMI (registered trademark, HDMI: high-definition multimedia interface), USB, infrared communication, and Bluetooth (registered trademark).

1.3. Functions of Projector 10

The processing apparatus 12 functions as an evaluator 121, a generator 122, a controller 1224, and an acceptor 126 by reading the control program from the storage apparatus 14 and executing the read control program.

The generator 122 generates the image information. The generator 122 includes a first generator 1222 and a second generator 1224. The controller 124 controls the liquid crystal light valves 162. The controller 124 includes a first controller 1242 and a second controller 1244. The acceptor 126 accepts the user's operation. The acceptor 126 includes a first acceptor 1262 and a second acceptor 1264.

Figure 9:
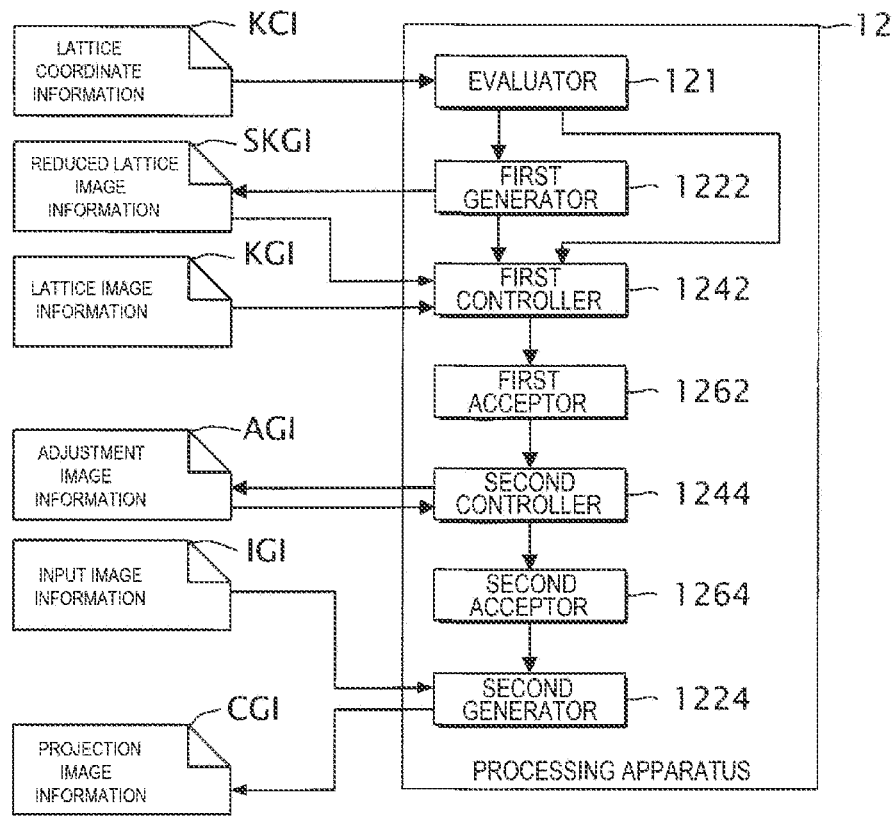
FIG. 9 shows the functions of the projector.

FIG. 9 shows the functions of the projector 10. The projector 10 has two operation modes, a target point selection mode and a target point adjustment mode. The target point selection mode is a mode in which a target point TP is selected from the plurality of lattice points GP in preparation for correction of the display position of the target point TP. The target point adjustment mode is a mode in which the display position of the selected target point TP is changed. The target point selection mode and the target point adjustment mode will each be described below.

1.3.1. Target Point Selection Mode

When the input apparatus 15 accepts an input representing a request for performing the geometry correction, the projector 10 transitions to the target point selection mode. As an example of the input of a request for performing the geometric correction, when the function list display key is pressed, the projector 10 displays letter strings representing a plurality of processes including the geometric correction on the projection surface SC. The user selects the letter string representing the geometric correction by operating the directional keys and the finalization key. The user's selection of the letter string representing the geometric correction corresponds to the input representing the request for performing the geometric correction.

After the transition to the target point selection mode, the evaluator 121 evaluates whether or not any of the plurality of lattice points GP contained in the lattice image KG is a lattice point GP located outside the projection area PA. As a specific method of the evaluation, the evaluator 121 refers to the lattice coordinate information KCI, sets the variable k at zero, and evaluates whether or not the lattice point GP_k is located outside the projection area PA. Symbol k is an integer. In the present embodiment, the evaluator 121 determines that the lattice point GP_k is located in the projection area PA when the coordinates of the lattice point GP_k satisfy the following condition and determines that the lattice point GP_k is not located within the projection area PA when the condition is not satisfied.

$$0 \le gp\_kx \le 1279, \text{ and } 0 \le gp\_ky \le 799$$

In the expression, gp_kx is the X coordinate of the lattice point GP_k, and gp_ky is the Y coordinate of the lattice point GP_k.

The evaluator 121 increments the variable k by one when the lattice point GP_k is located in the projection area PA. After incrementing the variable k by one and when the resultant variable k is smaller than n, the evaluator 121 evaluates whether or not the lattice point GP_k is located outside the projection area PA. After incrementing the variable k by one, and when the resultant variable k coincides with n, the evaluator 121 determines that there is no lattice point GP located outside the projection area PA.

On the other hand, when the lattice point GP_k is located outside the projection area PA, the evaluator 121 determines that there is a lattice point GP located outside the projection area PA. For example, when the lattice coordinate information KCI has the state shown in FIG. 7, the evaluator 121 provides an affirmative evaluation result. When the lattice coordinate information KCI has the state shown in FIG. 5, the evaluator 121 provides a negative evaluation result. The following description will be made of the case where the result of evaluation performed by the evaluator 121 is affirmative and the case where the result of the evaluation performed by the evaluator 121 is negative.

1.3.1.1. Case where there is Lattice Point GP Located Outside Projection Area PA When the evaluator 121 determines that there is a lattice point GP located outside the projection area PA, the first generator 1222 generates reduced lattice image information SKGI representing a reduced lattice image SKG, which is the lattice image KG so reduced in size as to fall within the projection area PA. The reduced lattice image SKG is an example of a "second image". The reduced lattice image information SKGI is an example of "image information representing the second image". In the embodiment, the first generator 1222 reduces the lattice image KG with the aspect ratio of the lattice image KG maintained.

Figure 10:
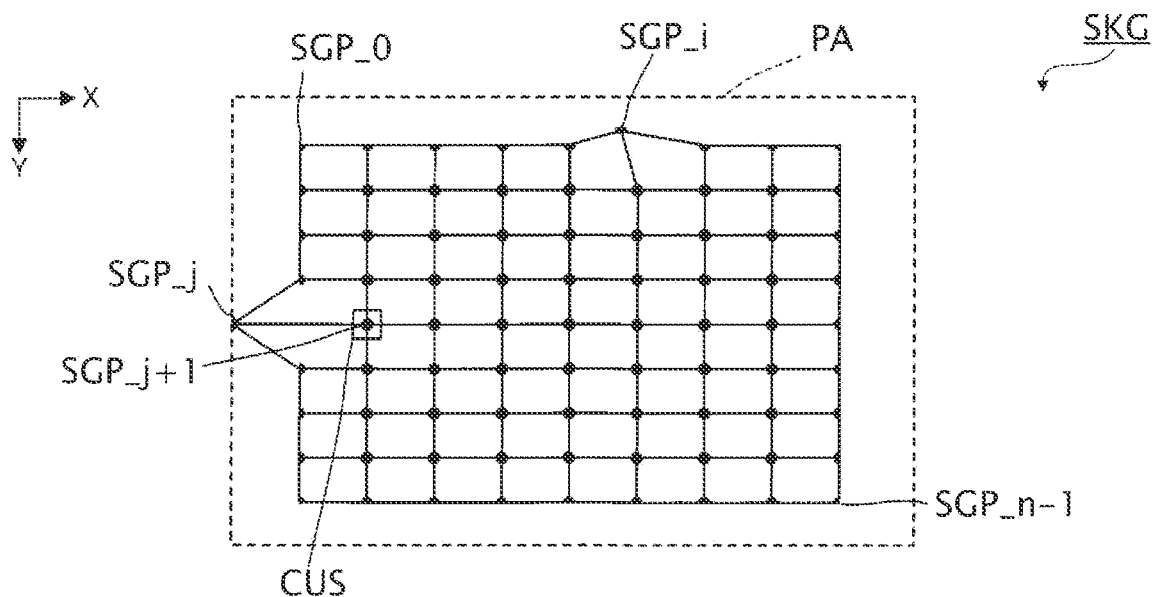
FIG. 10 shows an example of a reduced lattice image.

FIG. 10 shows an example of the reduced lattice image SKG. The reduced lattice image SKG shown in FIG. 10 is a reduced version of the lattice image KG shown in FIG. 6. The reduced lattice image SKG contains a plurality of lattice points SGP. The reduced lattice image SKG further contains line segments connecting the lattice points SGP. The reduced lattice image SKG still further contains a selection cursor CUS, which is used to select a target point TP. In FIG. 10, the projection area PA is drawn with a broken line to show the positional relationship between the reduced lattice image SKG and the projection area PA. In practice, the reduced lattice image SKG may contain no frame representing the projection area PA. The selection cursor CUS shown in FIG. 10 is a frame that surrounds one lattice point SGP out of the plurality of lattice points SGP.

The plurality of lattice points SGP correspond to the plurality of lattice points GP in a one-to-one relationship. For example, a lattice point SGP_0 corresponds to the lattice point GP_0, a lattice point SGP_i corresponds to the lattice point GP_i, a lattice point SGP_j corresponds to the lattice point GP_j, and the lattice point SGP_n−1 corresponds to the lattice point GP_n−1. In the example shown in FIG. 10, the selection cursor CUS is located at a lattice point SGP_j+1, which is located next to the lattice point SGP_j in the direction +X.

The first generator 1222 generates the reduced lattice image information SKGI representing the reduced lattice image SKG by reducing the lattice image KG in such a way that the lattice point GP_j contained in the lattice image KG is tangent to the outer circumference of the projection area PA. The lattice point GP_j is the lattice point GP farthest from the outer circumference of the projection area PA out of the plurality of lattice points GP located on the outer circumference of the lattice image KG shown in FIG. 6. The lattice point GP_j is an example of a "second candidate point".

To generate the reduced lattice image information SKGI, the first generator 1222 identifies a lattice point GP farthest from the outer circumference of the projection area PA, calculates a reduction ratio RR based on the identified lattice point GP, and generates the reduced lattice image information SKGI by reducing the lattice image KG in accordance with the calculated reduction ratio.

In the identification of a lattice point GP farthest from the outer circumference of the projection area PA, the first generator 1222, for example, selects a positional relationship representing each lattice point GP_m of the plurality of lattice points GP located on the outer circumference of the lattice image KG from eight positional relationships with the projection area PA shown below in accordance with the position of the lattice point GP_m. The first generator 1222 then calculates a distance D from each of the lattice points GP_m to the outer circumference of the projection area PA based on a calculation formula according to the identified positional relationship and identifies a lattice point GP having the largest distance D as the lattice point GP farthest from the outer circumference of the projection area PA. Symbol m is an integer ranging from 0 to n−1.

In a first positional relationship, the lattice point GP_m is shifted in the direction −Y from the projection area PA. When $0 \leq gp\_mx \leq 1279$ and $gp\_my<0$ are satisfied, the positional relationship of the lattice point GP_m with the projection area PA is the first positional relationship. Symbol gp_mx is the X coordinate of the lattice point GP_m. Symbol gp_my is the Y coordinate of the lattice point GP_m. When the positional relationship of the lattice point GP_m with the projection area PA is the first positional relationship, the first generator 1222 calculates −gp_my as the distance D.

In a second positional relationship, the lattice point GP_m is shifted in a direction between the direction −Y and the direction +X from the projection area PA. When $gp\_mx>1279$ and $gp\_my<0$ are satisfied, the positional relationship of the lattice point GP_m with the projection area PA is the second positional relationship. When the positional relationship of the lattice point GP_m with the projection area PA is the second positional relationship, the first generator 1222 calculates $((gp\_mx-1279)^2+gp\_my^2)^{0.5}$ as the distance D.

In a third positional relationship, the lattice point GP_m is shifted in the direction +X from the projection area PA. When $gp\_mx>1279$ and $0 \leq gp\_my \leq 799$ are satisfied, the positional relationship of the lattice point GP_m with the projection area PA is the third positional relationship. When the positional relationship of the lattice point GP_m with the projection area PA is the third positional relationship, the first generator 1222 calculates gp_mx−1279 as the distance D.

In a fourth positional relationship, the lattice point GP_m is shifted in a direction between the direction +Y and the direction +X from the projection area PA. When $gp\_mx>1279$ and $gp\_my>799$ are satisfied, the positional relationship of the lattice point GP_m with the projection area PA is the fourth positional relationship. When the positional relationship of the lattice point GP_m with the projection area PA is the fourth positional relationship, the first generator 1222 calculates $((gp\_mx-1279)^2+(gp\_my-799)^2)^{0.5}$ as the distance D.

In a fifth positional relationship, the lattice point GP_m is shifted in the direction +Y from the projection area PA. When $0 \leq gp\_mx \leq 1279$ and $gp\_my>799$ are satisfied, the positional relationship of the lattice point GP_m with the projection area PA is the fifth positional relationship. When the positional relationship of the lattice point GP_m with the projection area PA is the fifth positional relationship, the first generation part 1222 calculates gp_my−799 as the distance D.

In a sixth positional relationship, the lattice point GP_m is shifted in a direction between the direction +Y and the direction −X from the projection area PA. When $gp\_mx<0$ and $gp\_my>799$ are satisfied, the positional relationship of the lattice point GP_m with the projection area PA is the sixth positional relationship. When the positional relationship of the lattice point GP_m with the projection area PA is the sixth positional relationship, the first generator 1222 calculates $(gp\_mx^2+(gp\_my-799)^2)^{0.5}$ as the distance D.

In a seventh positional relationship, the lattice point GP_m is shifted in the direction −X from the projection area PA. When $gp\_mx<0$ and $0 \leq gp\_my \leq 799$ are satisfied, the positional relationship of the lattice point GP_m with the projection area PA is the seventh positional relationship. When the positional relationship of the lattice point GP_m with the projection area PA is the seventh positional relationship, the first generator 1222 calculates −gp_mx as the distance D.

In an eighth positional relationship, the lattice point GP_m is shifted in a direction between the direction −Y and the direction −X from the projection area PA. When $gp\_mx<0$ and $gp\_my<0$ are satisfied, the positional relationship of the lattice point GP_m with the projection area PA is the eighth positional relationship. When the positional relationship of the lattice point GP_m with the projection area PA is the eighth positional relationship, the first generator 1222 calculates $(gp\_mx^2+gp\_my^2)^{0.5}$ as the distance D.

In the calculation of the reduction rate RR, the first generator 1222, for example, executes Expression (1) below to calculate the reduction ratio RR.

$$RR = \frac{|G-C|}{|G-\text{GP\_m}|} \tag{1}$$

It is noted that the center of gravity G in Expression (1) is the center of gravity of the projection region PA. The center of gravity is the point where the sum of the first order moments is zero in a target shape. When the target shape is a rectangular shape, the center of gravity is the intersection of the diagonal lines of the rectangular shape. The intersection C is the intersection of the line segment connecting the lattice point GP_m farthest from the outer circumference of the projection area PA to the center of gravity G of the projection area PA and the outer circumference of the projection area PA. |G−GP_m| represents the length of the line segment connecting the lattice point GP_m farthest from the outer circumference of the projection area PA to the center of gravity G. |G−C| represents the length of the line segment connecting the center of gravity G to the intersection C.

Expression (1) can be expressed by using the coordinates of the lattice point GP_m farthest from the outer circumference of the projection area PA (gp_mx, gp_my), the coordinates of the intersection C (pa_cx, pa_cy), and the coordinates of the center of gravity G (gx, gy) and can therefore be transformed into Expression (2).

$$RR = \frac{\sqrt{(gx - \text{pa\_cx})^2 + (gy - \text{pa\_cy})^2}}{(gx - \text{gp\_mx})^2 + (gy - \text{gp\_my})^2} \quad (2)$$

A specific example of identification of the lattice point GP farthest from the outer circumference of the projection area PA and a specific example of the calculation of the reduction rate RR will be described with reference to FIG. 11.

Figure 11:
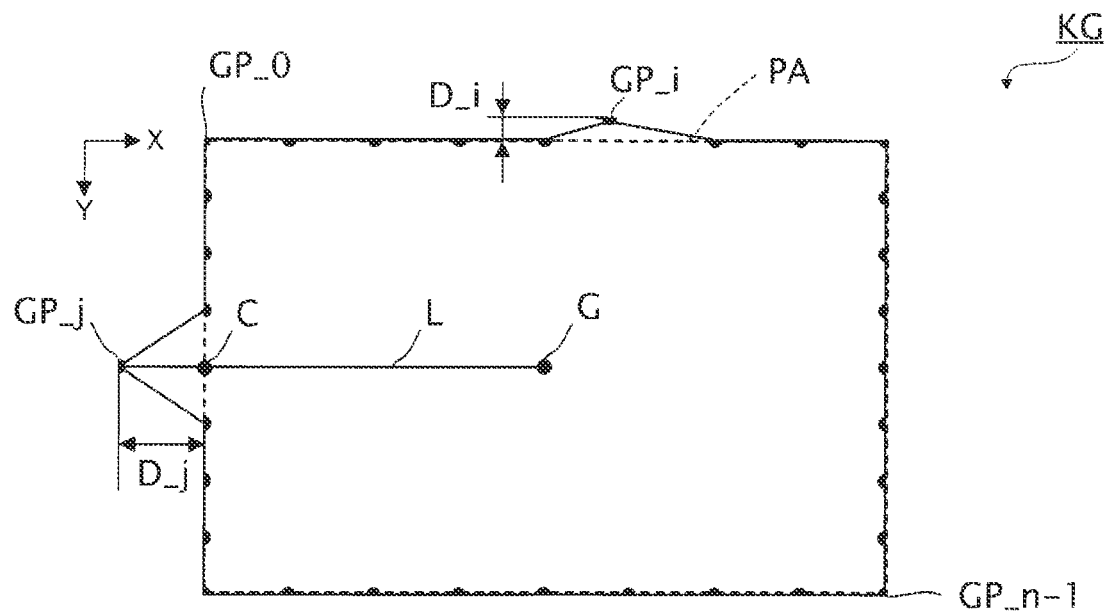
FIG. 11 shows an example of identification of a lattice point farthest from the outer circumference of a projection area and an example of calculation of a reduction ratio.

FIG. 11 shows an example of identification of the lattice point GP farthest from the outer circumference of the projection area PA and an example of the calculation of the reduction ratio RR. The lattice points GP shown in FIG. 11 are the plurality of lattice points GP located on the outer circumference of the lattice image KG. For simplicity of the description, only the lattice points GP_i and GP_j out of the plurality of lattice points GP located on the outer circumference of the lattice image KG will be described. The lattice point GP_i satisfies the first positional relationship out of the eight positional relationships described above. The distance D_i to the lattice point GP_i is therefore −gp_my. Therefore, referring to the lattice coordinate information KCI shown in FIG. 7, the distance D_i=−gp_my=−(−40)=40. On the other hand, the lattice point GP_j satisfies the seventh positional relationship. The distance D_j to the lattice point GP_j is −gp_mx. Therefore, referring to the lattice coordinate information KCI shown in FIG. 6, the distance D_j=−gp_mx=−(−160)=160. Therefore, since the distance D_j is greater than the distance D_i, the first generator 1222 identifies the lattice point GP_j as the lattice point GP farthest from the outer circumference of the projection area PA. The first generator 1222 then calculates the reduction ratio RR in accordance with the Expression (2). FIG. 11 shows the center of gravity G of the projection area PA, a line segment L connecting the coordinates of the lattice point GP_j to the center of gravity G of the projection area PA, and the intersection C of the line segment L and the outer circumference of the projection area PA.

The first generator 1222 generates the reduced lattice image information SKGI, which represents the reduced lattice image SKG, by reducing the lattice image KG in accordance with the reduction ratio RR.

The first controller 1242 controls the liquid crystal light valves in such a way that the reduced lattice image SKG is projected onto the projection surface SC. Specifically, the first controller 1242 controls the liquid crystal light valves 162 to cause them to modulate the light outputted from the light source 161 in accordance with the reduced lattice image information SKGI. As a result of the control over the liquid crystal light valves 162, the projection apparatus 16 projects the reduced lattice image SKG onto the projection surface SC.

The first acceptor 1262 accepts an input of selection of a target point TP from the plurality of points GP in the state in which the reduced lattice image SKG is projected on the projection surface SC. The input of selection of a target point TP is an example of a "first input".

Figure 12:
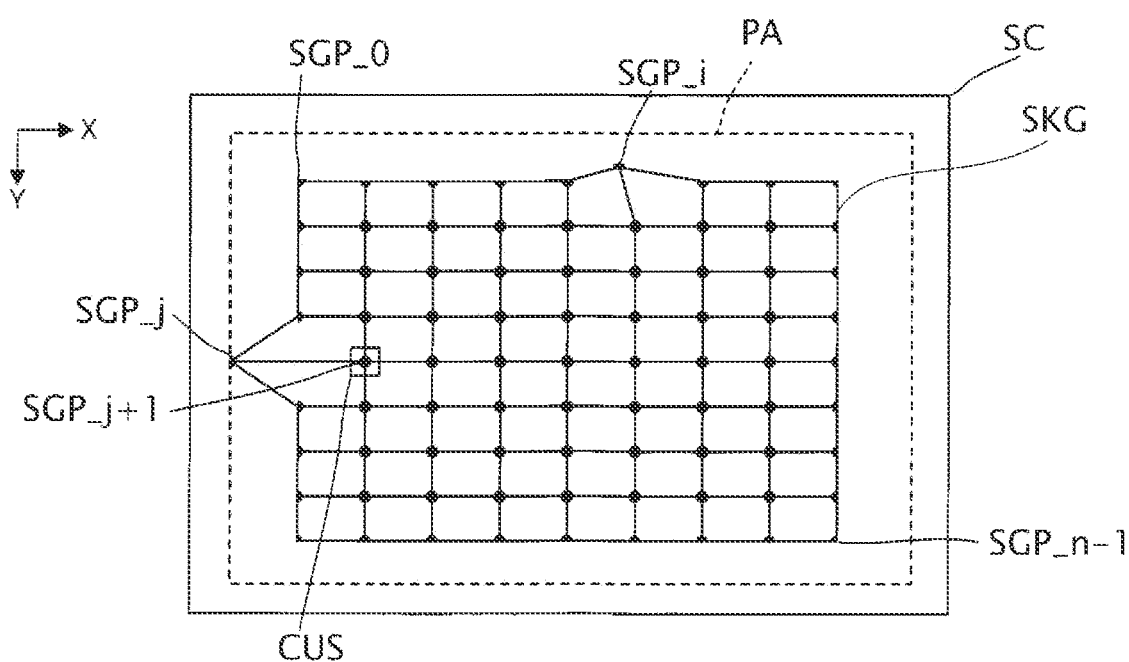
FIG. 12 shows an example of projection of the reduced lattice image.

FIG. 12 shows an example of projection of the reduced lattice image SKG. FIG. 12 shows the state in which the reduced lattice image SKG shown in FIG. 10 is projected on the projection surface SC. FIG. 12 further shows the projection area PA drawn with the broken line to show the position of the projection area PA relative to the position of the projection surface SC. In the example shown in FIG. 12, the selection cursor CUS is located at the lattice point SGP_j+1. For example, when the user presses the leftward key once, the selection cursor CUS moves to the lattice point SGP_j, which is located next to the lattice point SGP_j+1 in the direction −X. The first acceptor 1262 accepts an input made by pressing the finalization key as the input of selection of a target point TP. When the finalization key is pressed, the processing apparatus 12 selects the lattice point GP surrounded by the selection cursor CUS as the target point TP.

1.3.1.2. Case where No Lattice Point GP is Located Outside the Projection Area PA The description will be resumed with reference to FIG. 9. When the evaluator 121 determines that there is no lattice point GP located outside the projection area PA, the first controller 1242 projects the lattice image KG onto the projection surface SC. Specifically, the first controller 1242 controls the liquid crystal light valves 162 to cause them to modulate the light outputted from the light source 161 in accordance with the lattice image information KGI. As a result of the control over the liquid crystal light valves 162, the projection apparatus 16 projects the lattice image KG onto the projection surface SC.

In the state in which the lattice image KG is projected on the projection surface SC, the first acceptor 1262 accepts an input of selection of a target point TP from the plurality of lattice points GP.

1.3.2. Target Point Adjustment Mode

When the first acceptor 1262 accepts an input of selection of a target point TP, the projector 10 transitions to the target point adjustment mode. In the target point adjustment mode, the operation of the projector 10 when the result of the evaluation performed by the evaluator 121 is affirmative so that the reduced lattice image SKG is projected on the projection surface SC differs from the operation of the projector 10 when the result of the evaluation performed by the evaluator 121 is negative so that the lattice image KG is projected on the projection surface SC. The operation of the projector 10 in each of the cases described above will be described.

1.3.2.1. Case where Reduced Lattice Image SKG is Projected on Projection Surface SC When the projector 10 transitions to the target point adjustment mode with the reduction lattice image SKG projected on the projection surface SC, the second controller 1244 controls the liquid crystal light valves 162 in such a way that an adjustment image AG is projected onto the projection surface SC. The adjustment image AG is an example of a "third image". As a result of the control over the liquid crystal light valves 162, the projection apparatus 16 projects the adjustment image AG onto the projection surface SC.

Figure 13:
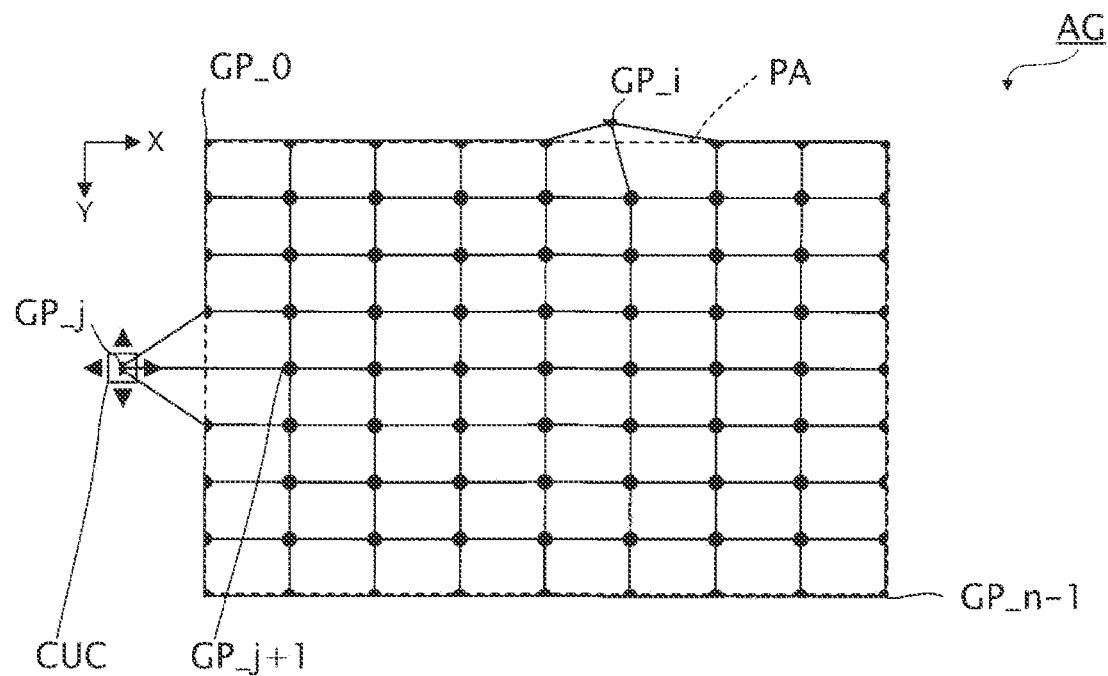
FIG. 13 is an example of an adjustment image.

FIG. 13 is an example of the adjustment image AG. The adjustment image AG is the reduced lattice image SKG enlarged to the size of the lattice image KG. Specifically, the adjustment image AG contains an enlarged version of the reduced lattice image SKG and a correction cursor CUC in place of the selection cursor CUS. The enlarged version of the reduced lattice image SKG has two aspects presented below. A first aspect relates to an image resulting from actual enlargement of the reduced lattice image SKG. A second aspect relates to the lattice image KG itself. Either the first aspect or the second aspect can be employed as long as the following process can be carried out. The following description will be made on the assumption that the first aspect relates to the enlarged version of the reduced lattice image SKG. The processing apparatus 12 generates adjustment image information AGI, which represents the adjustment image AG, based on the reduced lattice image information SKGI.

The correction cursor CUC is used to change the display position of a target point TP. The correction cursor CUC shown in FIG. 13 is formed of a frame that surrounds a target point TP and four substantially equilateral triangles with sides thereof being adjacent to the four sides of the frame. In the example in FIG. 13, the correction cursor CUC is located at the lattice point GP_j. That is, FIG. 13 shows a case where the lattice point GP_j is the target point TP.

The adjustment image AG shown in FIG. 13 has a portion located outside the projection area PA. Specifically, the lattice point GP_i, the lattice point GP_j, and the correction cursor CUC are located outside the projection area PA.

The second acceptor 1264 accepts an input of a change in the display position of the target point TP in the state in which the adjustment image AG is projected on the projection surface SC. The input of a change in the display position of the target point TP is an example of a "second input".

Figure 14:
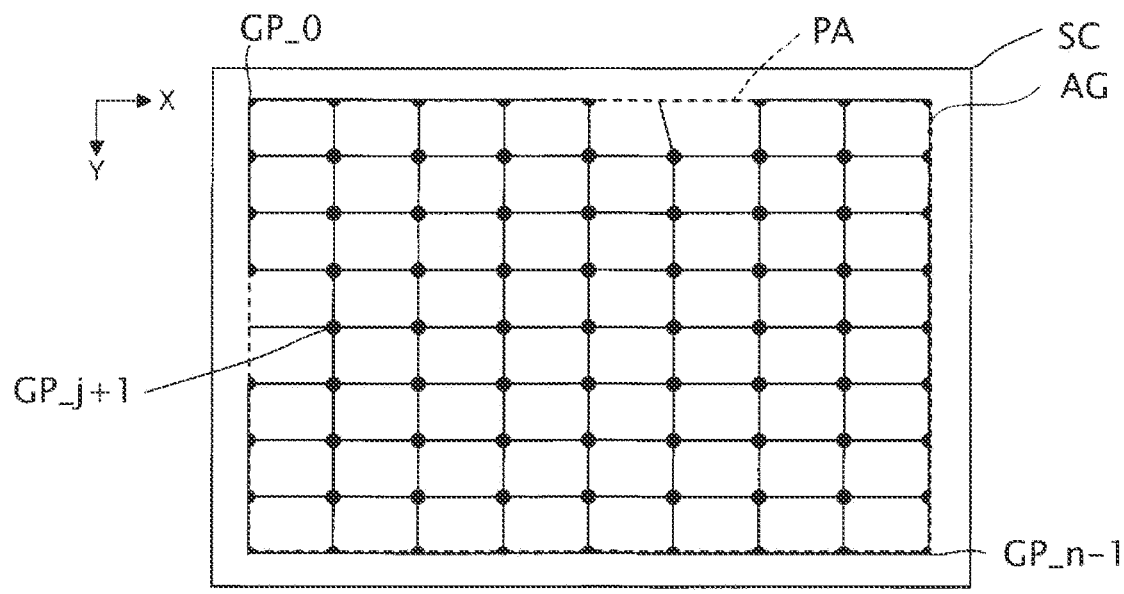
FIG. 14 shows an example of projection of the adjustment image.

FIG. 14 shows an example of projection of the adjustment image AG. FIG. 14 shows the state in which the adjustment image AG shown in FIG. 13 is projected on the projection surface SC. FIG. 14 further shows the projection area PA drawn with the broken line to show the position of the projection area PA relative to the projection surface SC. A portion of the adjustment image AG that is the portion contained in the projection area PA is projected on the projection surface SC. The lattice point GP_i, the lattice point GP_j, and the correction cursor CUC are not displayed on the projection surface SC because they are located outside the projection area PA.

The second acceptor 1264 accepts an input of the user's pressing of any of the directional keys as the input of a change in the display position of the target point TP. For example, when the second acceptor 1264 accepts an input made by pressing the upward key once, the positions of the lattice point GP_j and the correction cursor CUC move in the direction −Y. However, the lattice point GP_j and the correction cursor CUC after the movement are located outside the projection area PA and are therefore not displayed on the projection surface SC. In the example shown in FIG. 14, a portion of the image displayed in the projection area PA that is the portion updated when the user presses the upward key once is the line segment between the lattice point GP_j and the lattice point GP_j+1. The gradient of the line segment changes after updated.

The second generator 1224 generates the projection image information CGI representing the projection image CG, which results from the correction of the shape of the input image IG, based on the input of the change in the display position of the target point TP. The processes carried out by the second generator 1224 will be described with reference to FIGS. 15 and 16.

Figure 15:
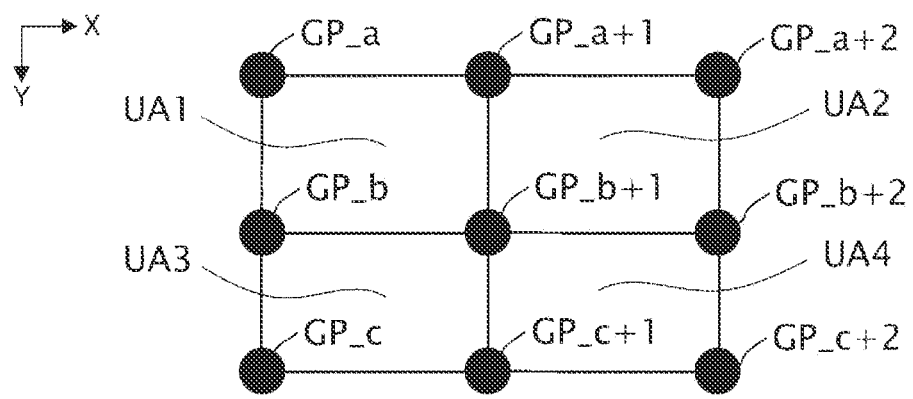
FIG. 15 shows an example of a plurality of unit areas contained in an input image.

FIG. 15 shows an example of a plurality of unit areas UA contained in the input image IG. Lattice points GP_a, GP_a+1, GP_a+2, GP_b, GP_b+1, GP_b+2, GP_c, GP_c+1, and GP_c+2 are located at vertices of unit areas UA1, UA2, UA3, and UA4. Symbols a, b, and c are each an integer greater than or equal to 0 but smaller than or equal to n−2. Further, the lattice point GP_b is located next to the lattice point GP_a in the direction +Y, and the lattice point GP_c is located next to the lattice point GP_b in the direction +Y. The unit areas UA1, UA2, UA3, and UA4 are part of the input image IG. The unit areas UA before the correction each have a rectangular shape, as shown in FIG. 15.

Figure 16:
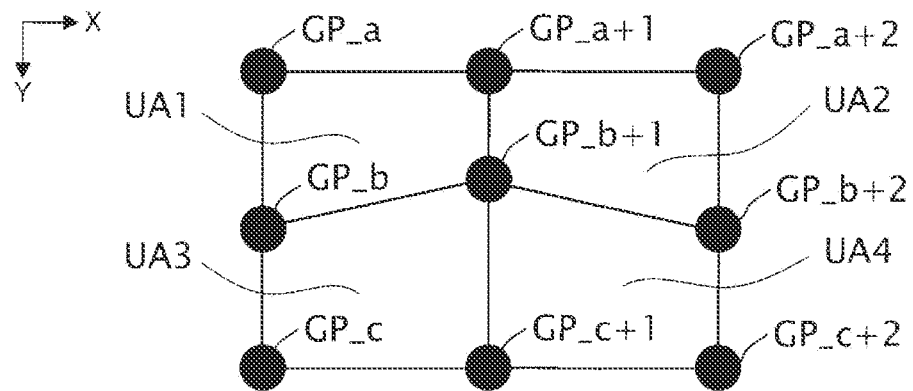
FIG. 16 shows an example of the plurality of unit areas after correction.

FIG. 16 shows an example of the plurality of unit areas UA after the correction. FIG. 16 shows a state in which the shapes of the plurality of unit areas UA have been deformed. Specifically, in FIG. 16, the lattice point GP_b+1 has been moved in the direction −Y so that the unit areas UA1, UA2, UA3, and UA4 have been deformed. The second generator 1224 generates image information representing images resulting from correction of the images in the unit areas UA before the deformation to images that fall within the unit areas UA after the deformation. Further, the second generator 1224 removes portions of the images so corrected as to fall within the unit areas UA after the deformation that are the portions located outside the projection area PA to generate the projection image information CGI representing the projection image CG.

The second generator 1224 updates the lattice image information KGI and the lattice coordinate information KCI based on the changed display position of the target point TP. After generating the projection image information CGI, the projector 10 terminates the geometric correction. After the geometric correction is terminated, the controller 124 controls the liquid crystal light valves 162 in such a way that the projection image CG is projected onto the projection surface SC. As a result of the control over the liquid crystal light valves 162, the projection apparatus 16 projects the geometrically corrected projection image CG onto the projection surface SC.

1.3.2.2. Case where Lattice Image KG is Projected on Projection Surface SC

When the projector 10 transitions to the target point adjustment mode with the lattice image KG projected on the projection surface SC, the second controller 1244 controls the liquid crystal light valves 162 in such a way that the adjustment image AG is projected onto the projection surface SC. As a result of the control over the liquid crystal light valves 162, the projection apparatus 16 projects the adjustment image AG onto the projection surface SC. The second acceptor 1264 accepts an input of a change in the display position of a target point TP in the state in which the adjustment image AG is projected on the projection surface SC.

The second generator 1224 generates the projection image information CGI representing the projection image CG, which results from the correction of the shape of the input image IG, based on the changed display position of the target point TP. The second generator 1224 updates the lattice image information KGI and the lattice coordinate information KCI based on the changed display position of the target point TP. After generating the projection image information CGI, the projector 10 terminates the geometric correction. After the geometric correction is terminated, the controller 124 controls the liquid crystal light valves 162 in such a way that the projection image CG is projected onto the projection surface SC. As a result of the control over the liquid crystal light valves 162, the projection apparatus 16 projects the projection image CG onto the projection surface SC.

1.4. Operation of Projector 10

The operation of the projector 10 will be described with reference to FIGS. 17 and 18.

Figure 17:
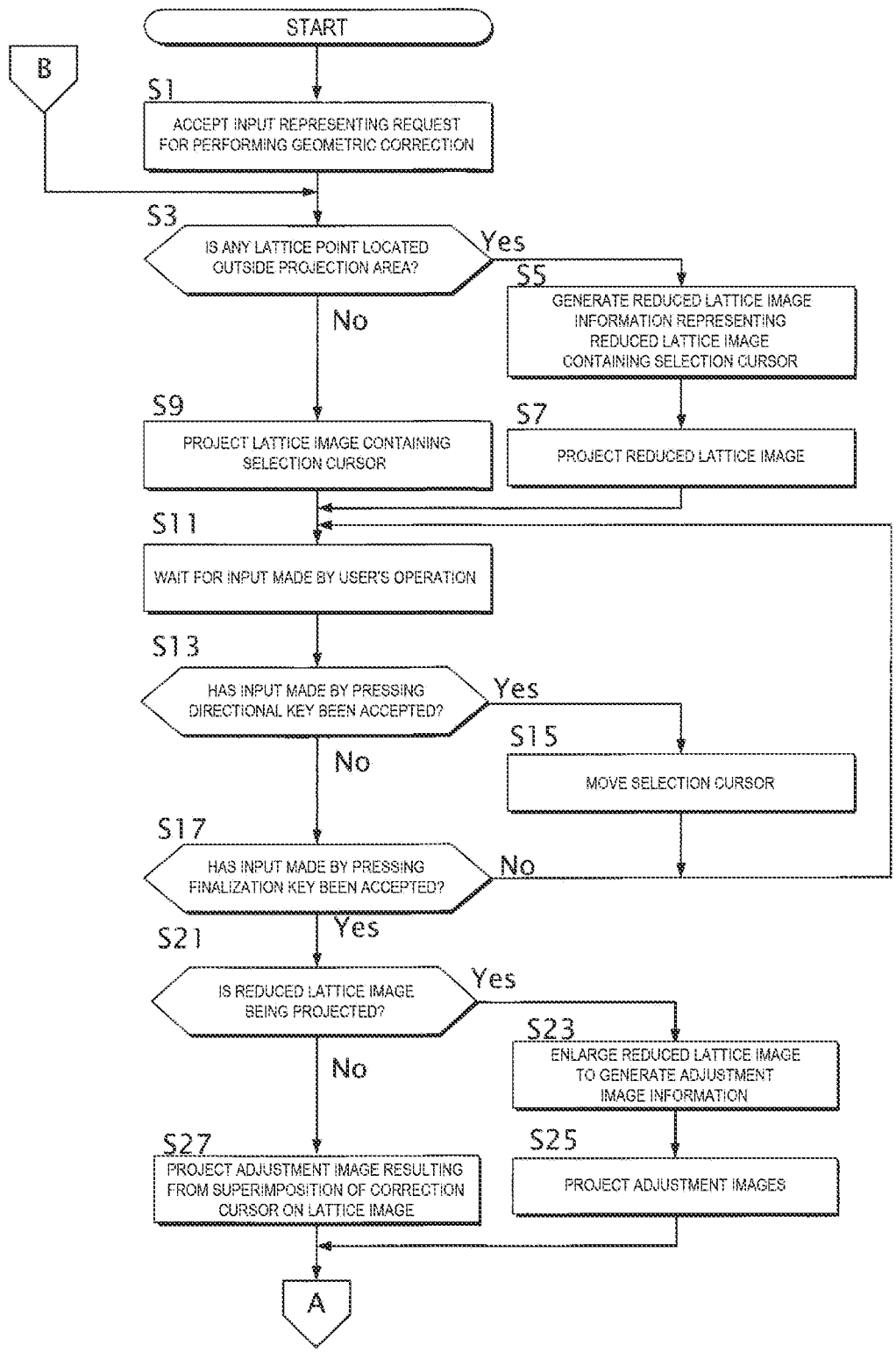
FIG. 17 is a flowchart showing the operation of the projector.
Figure 18:
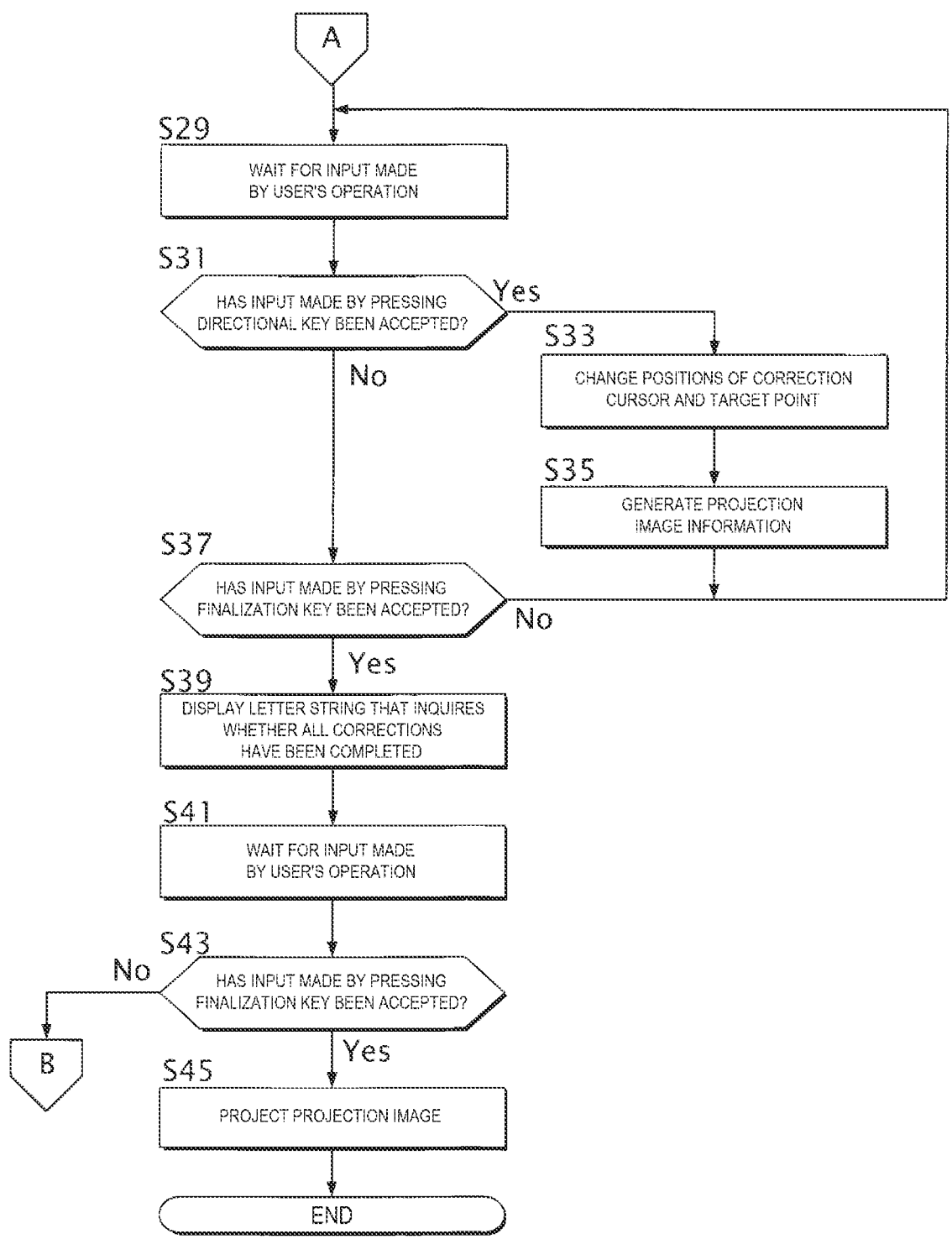
FIG. 18 is a flowchart showing the operation of the projector.

FIGS. 17 and 18 are flowcharts showing the operation of the projector 10. In step S1, the processing apparatus 12 accepts an input representing a request for performing the geometric correction.

Having accepted the input, the projector 10 transitions to the target point selection mode. After the transition to the target point selection mode, the processing apparatus 12 evaluates in step S3 whether or not any of the plurality of lattice points GP contained in the lattice image KG is located outside the projection area PA. The process in step S3 corresponds to the evaluator 121.

When the result of the evaluation in step S3 is affirmative, that is, when the result of step S3 is Yes, the processing apparatus 12 generates in step S5 the reduced lattice image information SKGI representing the reduced lattice image SKG containing the selection cursor CUS. The process in step S5 corresponds to the first generator 1222. After the process in step S5 is completed, the processing apparatus 12 controls the liquid crystal light valves 162 in the process in step S7 based on the reduced lattice image information SKGI in such a way that the reduced lattice image SKG is projected onto the projection surface SC. As a result of the control over the liquid crystal light valves 162, the projection apparatus 16 projects the reduced lattice image SKG onto the projection surface SC.

On the other hand, when the result of the evaluation in step S3 is negative, that is, when the result of step S3 is No, the processing apparatus 12 controls in step S9 the liquid crystal light valves 162 in such a way that the lattice image KG containing the selection cursor CUS is projected onto the projection surface SC. As a result of the control over the liquid crystal light valves 162, the projection apparatus 16 projects the lattice image KG onto the projection surface SC. The processes in steps S7 and S9 correspond to the first controller 1242.

After the process in step S7 is completed, or after the process in step S9 is completed, the processing apparatus 12 waits for an input made by the user's operation in step S11. In step S13, the processing apparatus 12 evaluates whether an input of the user's pressing of any of the directional keys has been accepted as the input made by the user's operation. When the result of the evaluation shows that an input of the user's pressing of any of the directional keys has been accepted, that is, when the result of step 313 is Yes, the processing apparatus 12 moves the selection cursor CUS in step S15 in accordance with the input made by pressing the directional key. After the process in step S15 is completed, the processing apparatus 12 returns to the process in step S11.

When the result of the evaluation shows that an input of the user's pressing of any of the directional keys has not been accepted, that is, when the result of step 313 is No, the processing apparatus 12 evaluates in step S17 whether or not an input made by pressing the finalization key has been accepted. When an input made by pressing the finalization key has not been accepted, that is, when the result of step 317 is No, for example, when an input made by pressing a key other than the finalization key and the directional keys, the processing apparatus 12 returns to the process in step S11. The case where the result of step S17 is Yes corresponds to the first acceptor 1262.

When the result of the evaluation shows that an input made by pressing the finalization key has been accepted, that is, when the result of step S17 is Yes, the projector 10 transitions to the target point adjustment mode, and the processing apparatus 12 evaluates in step S21 whether or not the reduced lattice image SKG is projected onto the projection surface SC.

When the result of the evaluation shows that the reduced lattice image SKG is projected on the projection surface SC, that is, when the result of step S21 is Yes, the processing apparatus 12 enlarges in step S23 the reduced lattice image SKG to the size of the lattice image KG to generate the adjustment image AG. After the process in step S23 is completed, the processing apparatus 12 controls in step S25 the liquid crystal light valves 162 in such a way that the adjustment image AG is projected onto the projection surface SC. As a result of the control over the liquid crystal light valves 162, the projection apparatus 16 projects the adjustment image AG onto the projection surface SC.

When the result of the evaluation shows that the reduced lattice image SKG is not projected on the projection surface SC, that is, when the result of step S21 is No, the processing apparatus 12 controls in step S27 the liquid crystal light valves 162 in such a way that the adjustment image AG resulting from superimposition of the correction cursor CUC on the lattice image KG is projected onto the projection surface SC. As a result of the control over the liquid crystal light valves 162, the projection apparatus 16 projects the adjustment image AG onto the projection surface SC. The processes in steps S25 and S27 correspond to the second controller 1244.

After the process in step S25 is completed, or after the process in step S27 is completed, the processing apparatus 12 waits for an input made by the user's operation in step S29. In step S31, the processing apparatus 12 evaluates whether or not an input made by pressing any of the directional keys has been accepted as the input made by the user's operation. When an input made by pressing any of the directional keys has been accepted, that is, when the result of step S31 is Yes, the processing apparatus 12 changes in step S33 the positions of the correction cursor CUC and target point TP in accordance with the input made by pressing the directional key. After the process in step S33 is completed, the processing apparatus 12 generates in step S35 the projection image information CGI resulting from the correction of the input image IG in accordance with the changed position of the target point TP. The process in step S35 corresponds to the second generator 1224. After the process in step S35 is completed, the processing apparatus 12 returns to the process in step S29.

When the result of the evaluation shows that an input made by pressing any of the directional keys has not been accepted, that is, when the result of step S31 is No, the processing apparatus 12 evaluates in step S37 whether or not an input made by pressing the finalization key has been accepted. When the result of the evaluation shows that an input made by pressing the finalization key has not been accepted, that is, No in step S37, for example, when an input made by pressing a key other than the finalization key and the directional keys has been accepted, the processing apparatus 12 returns to the process in step S29.

When the result of the evaluation shows that an input made by pressing the finalization key has been accepted, that is, when the result of step S37 is Yes, the processing apparatus 12 projects in step S39 a letter string that inquires whether all corrections have been completed on the projection surface SC. The letter string that inquires whether all corrections have been completed is, for example, "Press the finalization key when all corrections are completed. Press the cancel key when there is still a location where correction needs to be made". In step S41, the processing apparatus 12 waits for an input made by the user's operation. The processing apparatus 12 evaluates in step S43 whether or not an input made by pressing the finalization key has been accepted. When the result of the evaluation shows that an input made by pressing the finalization key has not been accepted, that is, when the result of step S43 is No, specifically, when the cancel key is pressed, the processing apparatus 12 returns to the process in step S3.

When the result of the evaluation shows that an input made by pressing the finalization key has been accepted, that is, when the result of step S43 is Yes, the processing unit 12 control in step S45 the liquid crystal light valves 162 in such a way that the projection image CG indicated by the projection image information CGI is projected onto the projection surface SC. As a result of the control over the liquid crystal light valves 162, the projection apparatus 16 projects the projection image CG onto the projection surface SC. After the process in step S45 is completed, the processing apparatus 12 terminates the series of processes shown in FIGS. 17 and 18.

1.5. Overview of Embodiment

As described above, the projector 10 projects the projection image CG resulting from the correction of the shape of the input image IG onto the projection surface SC. The processing apparatus 12 of the projector 10 functions as the first generator 1222, the first controller 1242, the first acceptor 1262, the second controller 1244, the second acceptor 1264, and the second generator 1224. The first generator 1222 generates the reduced lattice image information SKGI representing the reduced lattice image SKG resulting from reduction of the lattice image KG containing a plurality of lattice points GP, which are candidates for display position correction, to a size that falls within the projection area PA, which is the largest area over which the projector 10 can perform projection. The lattice points GP are each an example of the "candidate point". The lattice image KG is an example of the "first image". The reduced lattice image SKG is an example of the "second image". The reduced lattice image information SKGI is the example of "image information representing the second image". The first controller 1242 controls the liquid crystal light valves 162 to cause them to project the reduced lattice image SKG onto the projection surface SC. The first acceptor 1262 accepts an input of selection of a target point TP, which is a display position correction target, out of the plurality of lattice points GP, in the state in which the reduced lattice image SKG is projected on the projection surface SC. The input of selection of a target point TP is an example of the "first input". The second controller 1244 controls the liquid crystal light valves 162, after accepting the input of selection of the target point TP, to cause them to project the adjustment image AG resulting from enlargement of the reduced lattice image SKG to the size of the lattice image KG onto the projection surface SC. The adjustment image AG is an example of the "third image".

The second acceptor 1264 accepts an input of a change in the display position of the target point TP in the state in which the adjustment image AG is projected on the projection surface SC. The input of a change in the display position of the target point TP is an example of the "second input". The second generator 1224 generates the projection image information CGI representing the projection image CG, which results from the correction of the shape of the input image IG, based on the changed display position of the target point TP. The projection image information CGI is an example of the "image information representing a projection image". The controller 124 controls the liquid crystal light valves 162 to cause them to project the projection image CG onto the projection surface SC.

The embodiment, in which the reduced lattice image SKG is projected on the projection surface SC, allows the user who selects a target point TP to readily select a lattice point GP originally located outside the projection area PA. To change the coordinates of the target point TP with the reduced lattice image SKG projected, however, it is difficult for the user to correct the shape of the input image IG to a desired shape because the reduced lattice image SKG differs in shape from the lattice image KG actually used for the correction. For example, when the projection surface SC is the surface of a three-dimensional object, the input image IG cannot be so corrected that the shape thereof conforms to the shape of the three-dimensional object even when the reduced lattice image SKG is projected onto the three-dimensional object and the display position of the target point TP is changed TP because the reduced lattice image SKG differs in size from the lattice image KG.

In the embodiment, in which the display position of the target point TP is changed with the adjustment image AG projected, the display position of the target point TP can be changed without any change in the shape of the lattice image KG actually used for the correction, whereby the user can readily correct the shape of the input image IG to a desired shape. The projector 10 allows the user to not only check the overall shape of the lattice image KG but fit the shape of the input image IG by changing the display position of the target point TP without coupling the projector 10 to a computer having a screen.

Figure 19:
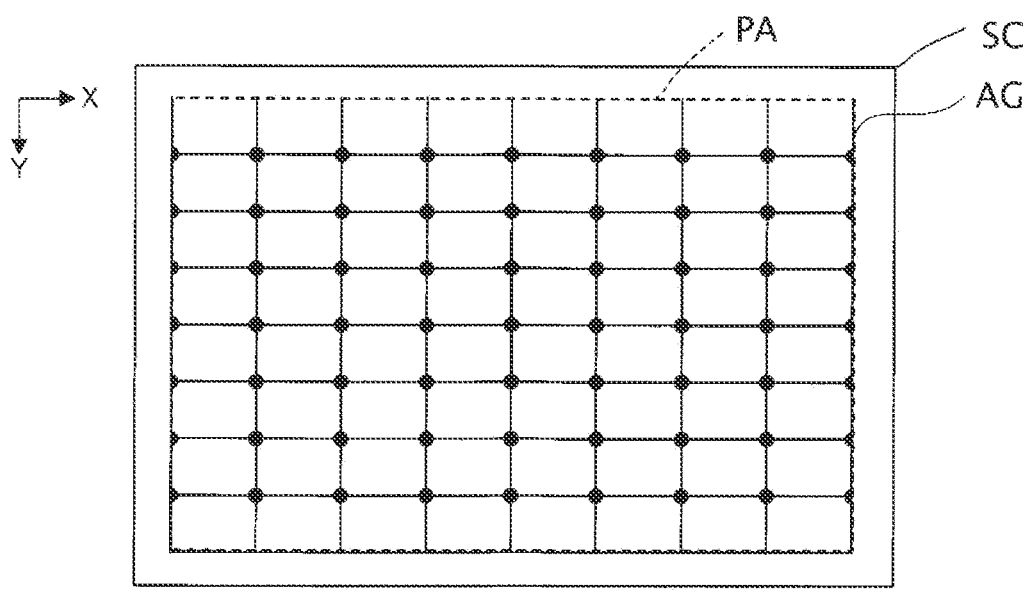
FIG. 19 shows an example of projection of the adjustment image.

Consider a configuration in which the black images BG1 and BG2 are not displayed in the input image IG shown in FIG. 2. FIG. 19 shows an example of projection of the adjustment image AG updated by the user, and FIG. 20 shows an example of projection of the projection image CG indicated by the projection image information CGI generated based on the updated adjustment image AG.

FIG. 19 shows an example of projection of the adjustment image AG. To prevent the black images BG1 and BG2 from being displayed, the user moves in the direction +Y the display positions of the group of the lattice points GP in the adjustment image AG that are closest to the positive side of the direction Y to adjust the group of the lattice points GP to be outside the projection area PA. Similarly, the user moves in the direction −Y the display positions of the group of the lattice points GP in the adjustment image AG that are closest to the negative side of the direction Y to adjust the group of the lattice points GP to be outside the projection area PA.

Figure 20:
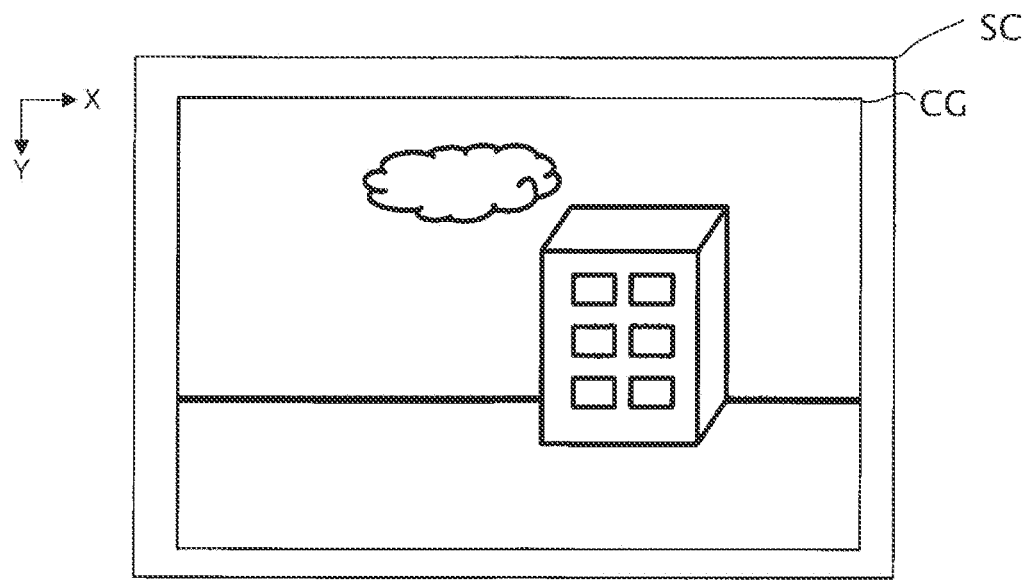
FIG. 20 shows an example of projection of a projection image.

FIG. 20 shows an example of projection of the projection image CG. The second generator 1224 generates the projection image information CGI based on the adjustment image AG shown in FIG. 19. Since the black images BG1 and BG2 are located outside the projection area PA, the black image BG1 or BG2 is not displayed on the projection surface SC. The image displayed on the projection surface SC is an image resulting from extension of the lower portion of the display target image ITG in the direction +Y and extension of the upper portion of the display target image ITG in the direction −Y.

Projecting the reduced lattice image SKG onto the projection surface SC involves reducing the lattice image KG in such a way that a first lattice point out of the plurality of lattice points GP is tangent to the outer circumference of the projection area PA.

Out of the plurality of lattice points GP, the first lattice point is located on the outer circumference of the lattice image KG and is farthest from the outer circumference of the projection area PA. The first lattice point is an example of the "second candidate point".

Projecting onto the projection surface SC the reduced lattice image SKG resulting from the reduction of the lattice image KG in such a way that the first lattice point is tangent to the outer circumference of the projection area PA causes a tendency for a greater number of lattice points SGP to be displayed on the projection surface SC than in an aspect of projecting the reduced lattice image SKG resulting from reduction of the lattice image KG in such a way that a lattice point less farther from the outer circumference of the projection area PA than the first lattice point is tangent thereto. The user can therefore readily select a greater number of lattice points GP.

2. Variations

The forms described above can be transformed in a variety of manners. Specific aspects of the transformation will be presented below by way of example. Two or more aspects arbitrarily selected from the examples below may be combined with each other as appropriate to the extent that the aspects do not contradict each other. In the variations presented below by way of example, an element having the same effect and function as those in the embodiment has the same reference character used in the above description, and no detailed description of the same element will be made as appropriate.

2.1. First Variation

In the embodiment, when the result of the evaluation performed by the evaluator 121 is negative, the projection apparatus 16 projects the adjustment image AG onto the projection surface SC, but not necessarily. For example, when the result of the evaluation performed by the evaluator 121 is negative, the projection apparatus 16 may project the lattice image KG. In other words, the projector 10 may not display the correction cursor CUC. To indicate a target point TP, for example, the projection apparatus 16 projects a lattice image KG in which target point TP differs in color from the lattice points GP excluding the target point. Similarly, the projector 10 may not display the selection cursor CUS. For example, the projection apparatus 16 projects a lattice image KG in which the currently selected lattice point GP differs in color from the lattice points excluding the currently selected lattice point GP out of the plurality of lattice points GP.

As described above, the processing apparatus 12 of the projector 10 in the first variation functions as the evaluator 121, the first generator 1222, the first controller 1242, the first acceptor 1262, the second acceptor 1264, and the second generator 1224. The evaluator 121 evaluates whether or not any of the plurality of lattice points GP contained in the lattice image KG is located outside the projection area PA. When the result of the evaluation performed by the evaluator 121 is affirmative, the first generator 1222 generates the reduced lattice image information SKGI representing the reduced lattice image SKG. When the evaluator 121 determines that there is no lattice point GP located outside the projection area PA, the first controller 1242 projects the lattice image KG onto the projection surface SC. In the state in which the lattice image KG is projected on the projection surface SC, the first acceptor 1262 accepts an input of selection of a target point TP from the plurality of lattice points GP.

In the state in which the lattice image KG is projected on the projection surface SC, the second acceptor 1264 accepts an input of a change in the display position of the target point TP. The second generator 1224 generates the projection image information CGI representing the projection image CG, which results from the correction of the shape of the input image IG, based on the input of the change in the display position of the target point TP. The controller 124 projects the projection image CG onto the projection surface SC.

According to the first variation, when there is no lattice point GP located outside the projection area PA, the lattice image KG is projected, whereby a target point TP can be selected without any change in the shape of the lattice image KG actually used for the correction.

2.2. Second Variation

In each of the aspects described above, the processing apparatus 12 may control the liquid crystal light valves 162 in such a way that a reduced input image SIG resulting from the reduction of the input image IG is generated in accordance with the size of the reduced lattice image SKG with respect to the size of the lattice image KG and an image resulting from superimposition of the reduced input image SIG on the reduced lattice image SKG is projected. The reduced input image SIG is an example of a "fourth image". The first lattice point in the present variation may be the same as or different from the first lattice point in other embodiments and variations. The "first lattice point" in the second variation is an example of a "first candidate point".

In the second variation, when the lattice image KG is superimposed on the input image IG, the relationship between the position of a first portion of the input image IG and the position of the first lattice point out of the plurality of lattice points GP coincides with the relationship between the position of a portion of the reduced input image SIG that is the portion corresponding to the first portion and the position of the first lattice point in the reduced lattice image SKG. The first portion is an arbitrary portion of the input image IG.

Figure 21:
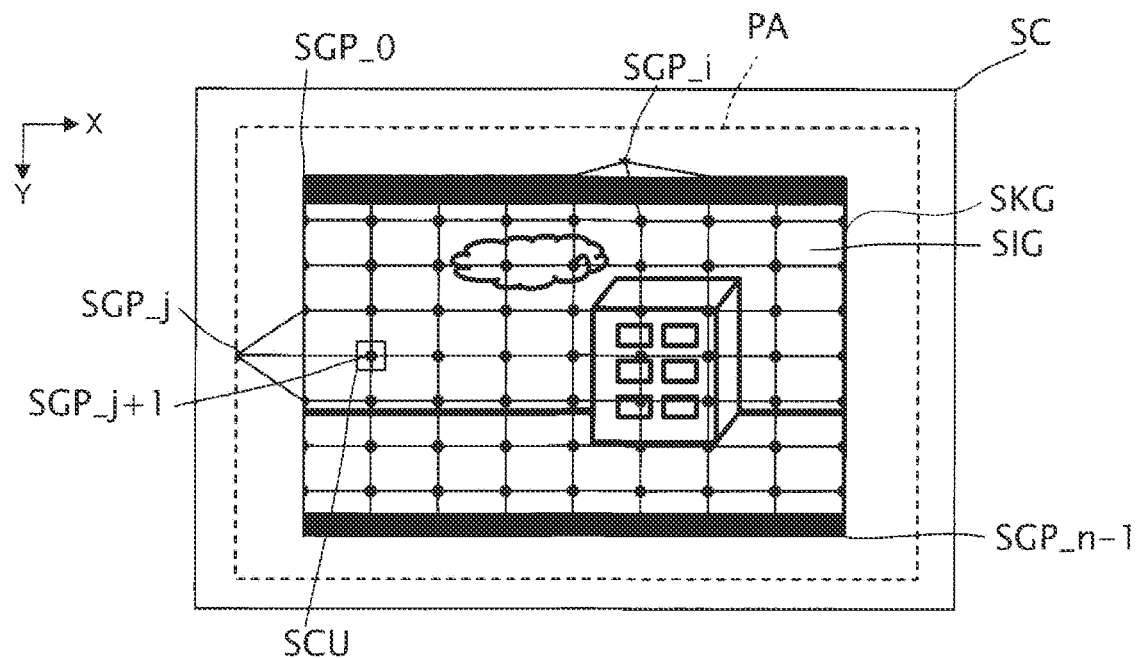
FIG. 21 shows an example of projection of an image resulting from superimposition of a reduced input image on the reduced lattice image.

FIG. 21 shows an example of projection of an image resulting from the superimposition of the reduced input image SIG on the reduced lattice image SKG. According to the second variation, the user can select a target point TP, which is the display position corrected target, while looking at the reduced input image SIG. Further, since the reduced lattice image SKG and the reduced input image SIG are reduced by the same reduction ratio, the relationship between the position of a lattice point GP contained in the lattice image KG and the position of a portion of the input image IG coincides with the relationship between the position of a lattice point SGP contained in the reduced lattice image SKG and the position of a portion in the reduced input image SIG. For example, a portion of the reduced input image SIG that is the portion corresponding to a portion of the input image IG that is the portion overlapping with the lattice point SGP_j contained in the lattice image KG overlaps with the lattice point SGP_j contained in the reduced lattice image SGP. Therefore, according to the second variation, the user can readily identify the lattice point GP corresponding to the position where the user desires to change the shape of the input image IG, as compared with an aspect in which the input image IG is superimposed on the reduced lattice image SKG.

2.3. Third Variation

In each of the aspects described above, the processing apparatus 12 may control the liquid crystal light valves 162 so as to project an image resulting from superimposition of the input image IG on the adjustment image AG.

2.4. Fourth Variation

In each of the aspects described above, the processing apparatus 12 may control the liquid crystal light valves 162 so as to project an image resulting from superimposition of an auxiliary image HG, which assists an input of a change in the display position of a target point TP, on the adjustment image AG. The auxiliary image HG has, for example, two aspects shown below.

Figure 22:
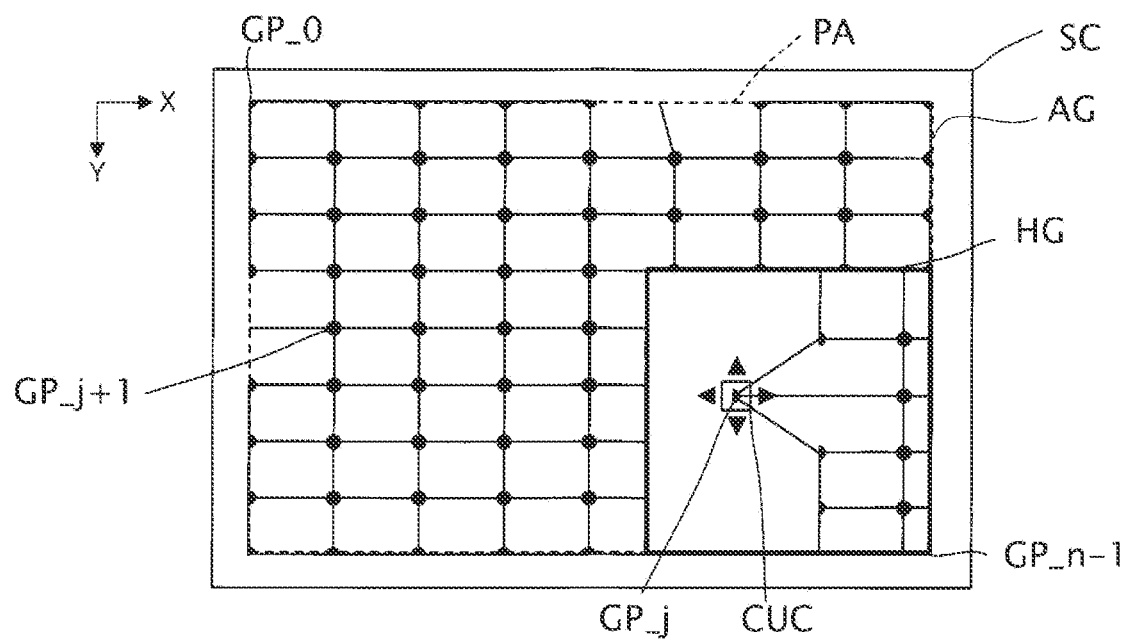
FIG. 22 shows an example of projection of an image resulting from superimposition of an auxiliary image in a first aspect on the adjustment image.

FIG. 22 shows an example of projection of an image resulting from superimposition of the auxiliary image HG in the first aspect on the adjustment image AG. The auxiliary image HG in the first aspect is an image containing the correction cursor CUC and a target point TP located outside the projection area PA. The auxiliary image HG shown in FIG. 22 shows an example in which the target point TP is the lattice point GP_j. The position where the auxiliary image HG in the first aspect is superimposed can be any portion of the projection area PA and is preferably away from the position where the correction cursor CUC is originally present. When the processing apparatus 12 accepts an input made by pressing any of the directional keys, the processing apparatus 12 changes the positions of the lattice point GP_j and the correction cursor CUC and updates the auxiliary image HG.

In the embodiment, when the target point TP is outside the projection area PA, the image in the projection area PA does not change in some cases even when the user presses any of the directional keys, and the user is unsure in some cases whether the directional key was actually pressed. Superimposing the auxiliary image HG in the first aspect on the adjustment image AG updates the auxiliary image HG in the first aspect when any of the directional keys is pressed even when the target point TP is outside the projection area PA, whereby the user can check that the directional key was actually pressed. Further, the user can check that the display position of the target point TP has been changed by looking at the auxiliary image HG in the first aspect.

When the auxiliary image HG is displayed in a position separate from the original position of the correction cursor CUC, a portion of the adjustment image AG that is the portion close to the correction cursor CUC is displayed on the projection surface SC, whereby the user can readily check a change in the shape of the adjustment image AG when the user presses any of the directional keys.

Figure 23:
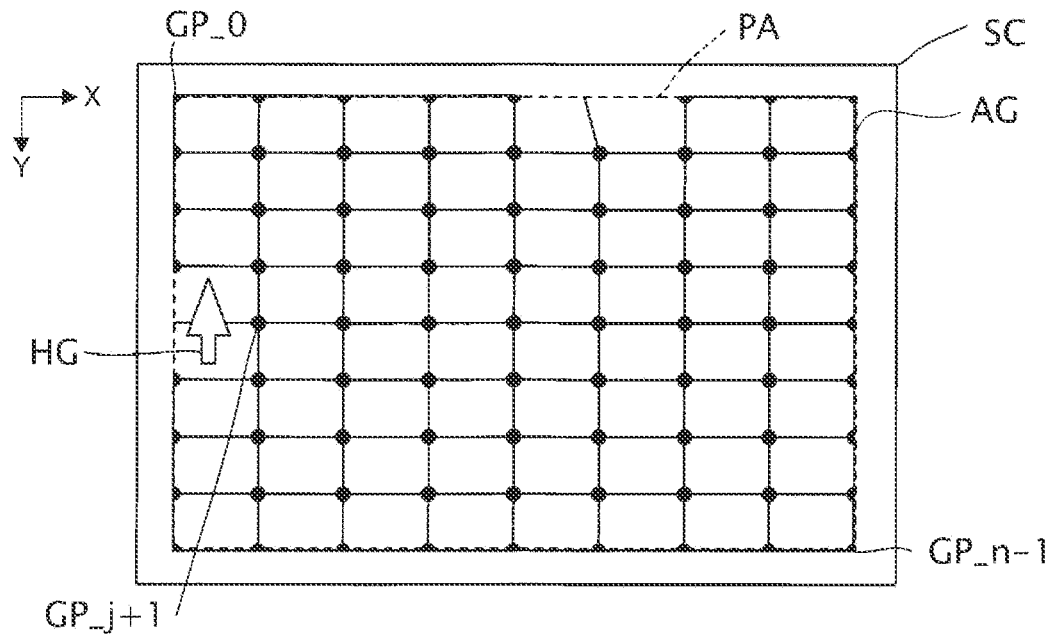
FIG. 23 shows an example of projection of an image resulting from superimposition of the auxiliary image in a second aspect on the adjustment image.

FIG. 23 shows an example of projection of an image resulting from superimposition of the auxiliary image HG in the second aspect on the adjustment image AG. The auxiliary image HG in the second aspect is an image showing the directional key pressed by the user. The auxiliary image HG shown in FIG. 23 is an arrow orienting in the direction -X and shows that the upward key was pressed. The position where the auxiliary image HG in the second aspect is superimposed may be any portion of the projection area PA and is preferably close to the original position of the correction cursor CUC.

When the processing apparatus 12 accepts an input made by pressing any of the directional keys, the processing apparatus 12 changes the positions of the lattice point GP_j and the correction cursor CUC and superimposes the auxiliary image HG indicating the pressed directional key on the adjustment image AG. Having superimposed the auxiliary image HG on the adjustment image AG, the processing apparatus 12 stops superimposing the auxiliary image HG after a predetermined period of few seconds elapses.

Superimposing the auxiliary image HG in the second aspect on the adjustment image AG allows the auxiliary image HG in the second aspect to be displayed when any of the direction key is pressed even when the target point TP is located outside the projection area PA, whereby the user can check that the directional key was actually pressed.

2.5. Fifth Variation

In each of the aspects described above, the first generator 1222 calculates the distance D from each lattice point GP_m of the plurality of lattice points located on the outer circumference of the lattice image kg to the outer circumference of the projection area PA, identifies the lattice point GP having the largest distance D as the lattice point GP farthest from the outer circumference of the projection area PA, and calculates the reduction ratio RR, but not necessarily. For example, the first generator 1222 may calculate the reduction ratio RR for each lattice point GP_m of the plurality of lattice points GP located on the outer circumference of the lattice image KG and reduce the lattice image KG in accordance with the smallest reduction ratio RR to generate the reduced lattice image information SKGI representing the reduced lattice image SKG.

Figure 24:
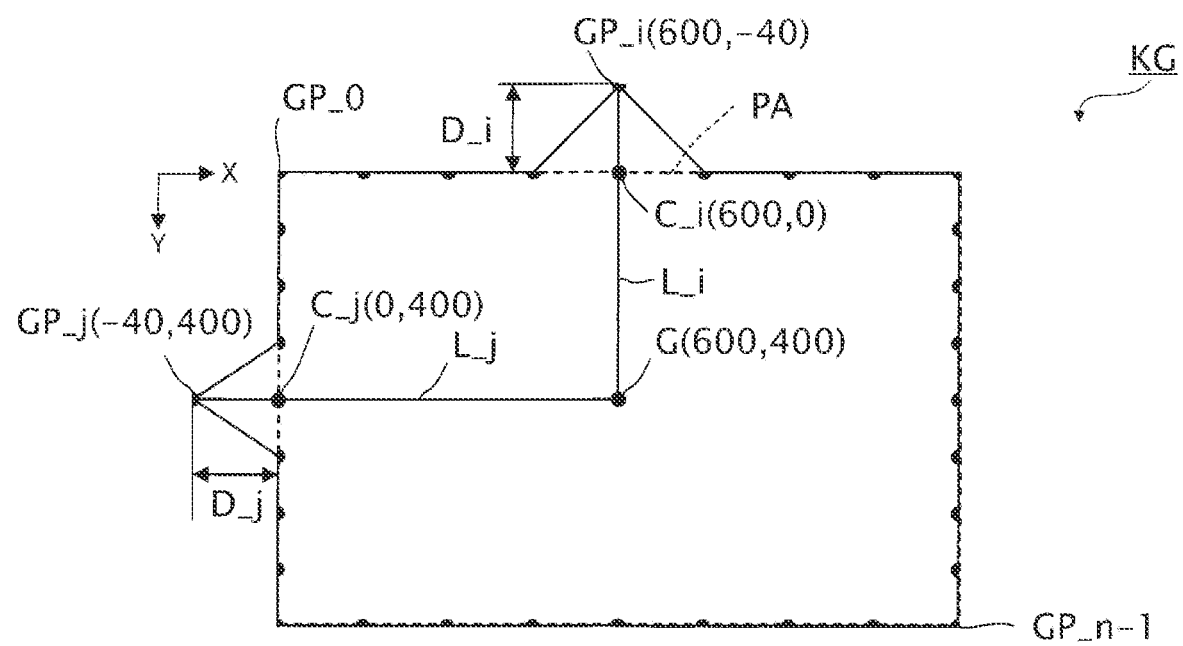
FIG. 24 shows an example of generation of reduced lattice image information in a fifth variation.

FIG. 24 shows an example of generation of the reduced lattice image information SKGI in the fifth variation. To simplify the description with reference to FIG. 24, only the lattice points GP_i and GP_j out of the plurality of lattice points GP located on the outer circumference of the lattice image KG are referred to. Further, to simplify the description, the description will be made on the assumption that the coordinates of the center of gravity G is (600, 400), the coordinates of the lattice point GP_i is (600, 0), and the coordinates of the lattice point GP_j is (-40, 400).

That is, the description will be made on the assumption that the distance D_i from the lattice point GP_i to the outer circumference of the projection area PA and the distance D_j from the lattice point GP_j to the outer circumference of the projection area PA are equal to each other and are each 40.

An intersection C_i shown in FIG. 24 is the intersection of a line segment L_i, which connects the lattice point GP_i to the center of gravity G of the projection area PA, and the outer circumference of the projection area PA. The coordinates of the intersection C_i is (600, 0). Similarly, an intersection C_j shown in FIG. 24 is the intersection of the line segment L_j, which connects the lattice point GP_j to the center of gravity G of the projection area PA, and the outer circumference of the projection area PA. The coordinates of the intersection C_j is (0, 400). The reduction ratio RR_i for the lattice point GP_i is determined in the form of Expression (3) below from Expression (1).

$$RR\_i = \frac{|G - C\_i|}{|G - GP\_i|} \qquad (3)$$

Similarly, the reduction ratio RR_j for the lattice point GP_j is determined in the form of Expression (4) below from Expression (1). In the fifth variation, the lattice point GP_i is an example of the "first candidate point". The line segment L_i is an example of a "first line segment". The reduction ratio RR_i is an example of a "first proportion". The lattice point GP_j is an example of the "second candidate point". The line segment L_j is an example of a "second line segment". The reduction ratio RR_j is an example of a "second proportion".

$$RR\_j = \frac{|G - C\_j|}{|G - GP\_j|} \quad (4)$$

To simplify the description, the magnitude relationship between the reduction ratio RR_i and the reduction ratio RR_j will be described by using specific numerical values. Assuming in Expression (3) that |G–GP_i| is 440 and |G–C_i| is 400, the reduction ratio RR_i is about 0.90. Similarly, assuming in Expression (4) that |G–GP_j| is 680 and |G–C_j| is 640, the reduction ratio RR_j is calculated to be about 0.94. The first generator 1222 therefore determines that the reduction rate RR_i is smaller than the reduction rate RR_j. The first generator 1222 generates the reduced lattice image information SKGI representing the reduced lattice image SKG by reducing the lattice image KG in accordance with the reduction ratio RR_i. The above description has been made by comparison using specific numerical values, and when the width of the projection area PA in the widthwise direction is longer than the width of the projection area PA in the lengthwise direction, the reduction ratio RR_i is smaller than the reduction ratio RR_j.

In the above description, the first generator 1222 identifies the magnitude relationship between the reduction ratio RR_i and the reduction ratio RR_j and may instead identify the magnitude relationship between the square of the reduction rate RR_i and the square of the reduction rate RR_j. The reason for this is that the reduction ratio RR_i and RR_j each have a positive value, and the magnitude relationship between the reduction ratio RR_i and the reduction ratio RR_j is the same as the magnitude relationship between the square of the reduction ratio RR_i and the square of the reduction ratio RR_j. The first generator 1222 may identify the smaller one of the square of the reduction ratio RR_i and the square of the reduction ratio RR_j and generate the reduced lattice image information SKGI by reducing the lattice image KG in accordance with the positive square root of the identified square. Identifying the smaller one of the square of the reduction ratio RR_i and the square of the reduction ratio RR_j allows the first generator 1222 to reduce the number of actions of computing the square root.

The first generator 1222 can generate the reduced lattice image information SKGI representing the reduced lattice image SKG that allows the plurality of lattice points GP located on the outer circumference of the lattice image KG to be all contained in the projection area PA by calculating the reduction ratio RR for each lattice point GP_m of the plurality of lattice points GP located on the outer circumference of the lattice image KG and reducing the lattice image KG in accordance with the smallest reduction ratio RR. An example of projection of the reduced lattice image SKG resulting from reduction of the lattice image KG in accordance with the reduction ratio RR_j and an example of projection of the reduced lattice image SKG resulting from reduction of the lattice image KG in accordance with the reduction ratio RR_i are shown in FIGS. 25 and 26.

Figure 25:
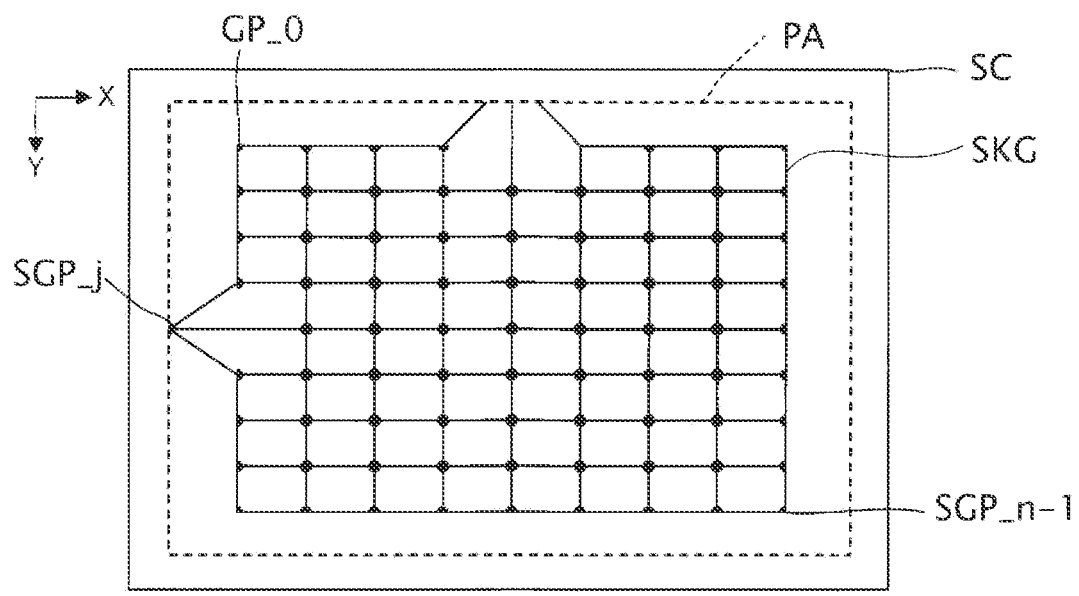
FIG. 25 shows an example of projection of the reduced lattice image resulting from reduction of the lattice image in accordance with a reduction ratio.

FIG. 25 shows an example of projection of the reduced lattice image SKG resulting from reduction of the lattice image KG in accordance with the reduction ratio RR_j. In the example shown in FIG. 25, out of all the lattice points SGP contained in the reduced lattice image SKG, the lattice point SGP_i is located outside the projection area PA and is therefore not displayed on the projection surface SC.

Figure 26:
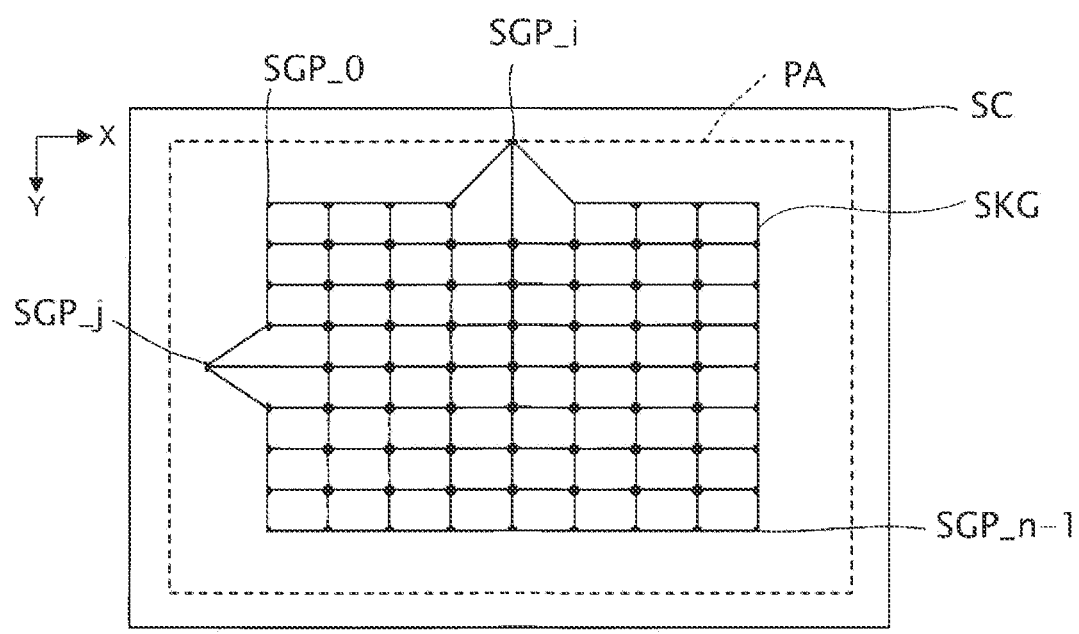
FIG. 26 shows an example of projection of the reduced lattice image resulting from reduction of the lattice image in accordance with another reduction ratio.

FIG. 26 shows an example of projection of the reduced lattice image SKG resulting from reduction of the lattice image KG in accordance with the reduction ratio RR_i. In the example shown in FIG. 26, all the lattice points SGP contained in the reduced lattice image SKG are located in the projection area PA, so that all the lattice points SGP are displayed on the projection surface SC. When three or more lattice points GP are located outside the projection area PA, selection of a smaller one of the reduction ratios at two lattice points allows at least part of the lattice points SGP to be displayed, and all the lattice points SGP can be displayed by using the smallest one of the reduction ratios at all the lattice points GP.

In the fifth variation described above, projecting the reduced lattice image SKG on the projection surface SC involves reducing the lattice image KG in accordance with a smaller one of a first reduction ratio RR1 for a first lattice point and a second reduction ratio RR2 for a second lattice point, the first and second lattice points being part of the plurality of lattice points GP and located on the outer circumference of the lattice image KG. The first lattice point in the fifth variation is an example of the "second candidate point", and the second lattice point is an example of a "third candidate point". The first reduction ratio RR1 is an example of the "first proportion", and the second reduction ratio RR2 is an example of the "second proportion". The first reduction ratio RR1 is the proportion of the length from the intersection of a first line segment and the outer circumference of the projection area PA to the center of gravity G of the projection area PA to the length of the first line segment, the first line segment being the line segment connecting the first lattice point to the center of gravity G. The second reduction ratio RR2 is the proportion of the length from the intersection of a second line segment and the outer circumference of the projection area PA to the center of gravity G to the length of the second line segment, the second line segment being the line segment connecting the second candidate point to the center of gravity G.

According to the fifth variation, the first generator 1222 can generate the reduced lattice image information SKGI representing the reduced lattice image SKG having the first lattice point and the second lattice point contained in the projection area PA.

2.6. Sixth Variation

The aforementioned aspects have been described with reference to the case where the first image is an image containing a plurality of lattice points GP and an example of the plurality of candidate points is the plurality of lattice points GP, but not necessarily. For example, the first image may be an image resulting from superimposition of a selection cursor CUSa in the sixth variation on a monochromatic image MG, and the plurality of candidate points may be all points in the monochromatic image MG.

Figure 27:
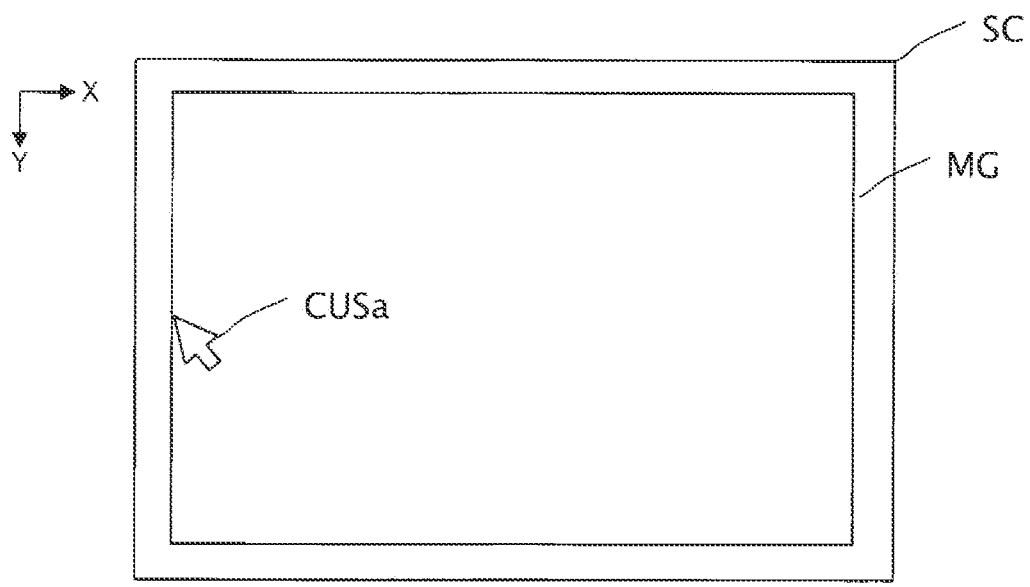
FIG. 27 shows an example of a target point selection mode in a sixth variation.

FIG. 27 shows an example of the target point selection mode in the sixth variation. The selection cursor CUSa has the shape of an arrow, and the tip of the arrow points at a point selected as the target point TP.

For example, when the user presses the leftward key once, the selection cursor CUSa moves in the direction –X by a distance corresponding to a predetermined number of pixels in the monochromatic image MG. The first acceptor 1262 accepts an input made by pressing the finalization key as the input of selection of a target point TP. When the finalization key is pressed, the processing apparatus 12 selects the point of the tip of the selection cursor CUSa as the target point TP.

Figure 28:
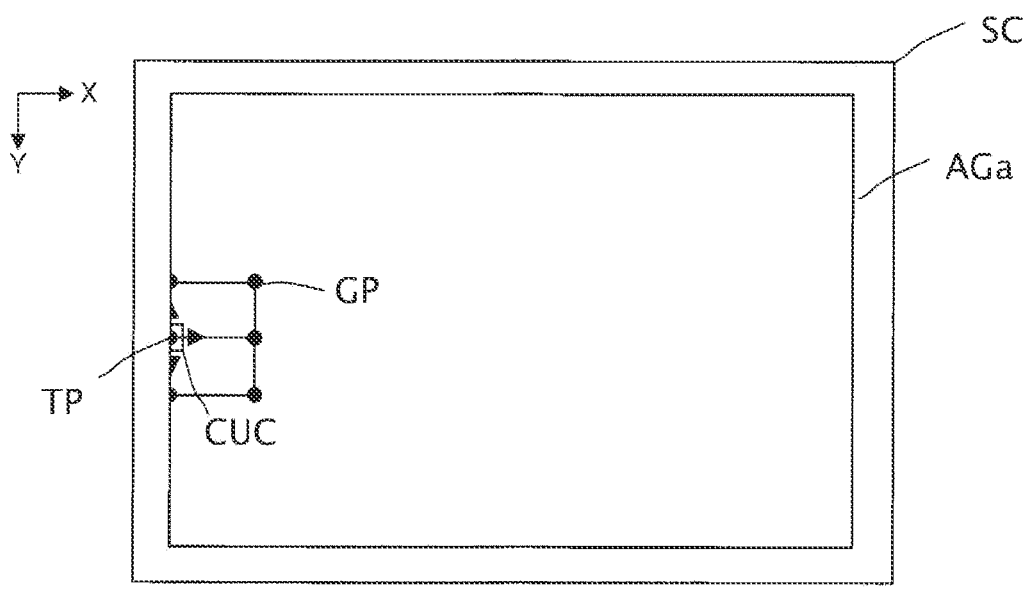
FIG. 28 shows an example of a target point adjustment mode in the sixth variation.

FIG. 28 shows an example of the target point adjustment mode in the sixth variation. In the target point adjustment mode, an adjustment image AGa in the sixth variation contains a target point TP and eight lattice points GP, which surround the target point TP. When the target point TP is located on the outer circumference of the monochromatic image MG, however, the target point TP and part of the eight lattice points GP are displayed in the projection area PA, as shown in FIG. 28. The second acceptor 1264 accepts an input of the user's pressing of any of the directional keys as the input of a change in the display position of the target point TP. The subsequent processes are the same as those in the embodiment.

2.7. Seventh Variation

In the aspects described above, the first generator 1222 reduces the lattice image KG with the aspect ratio of the lattice image KG maintained, but not necessarily. For example, the first generator 1222 may reduce the lattice image KG without maintaining the aspect ratio of the lattice image KG in such a way that the reduced lattice image SKG is maximized.

2.8. Other Variations

The projection apparatus 16 in each of the aspects described above uses liquid crystal light valves as the light modulator, and the light modulator may not be formed of liquid crystal light valves and can be changed as appropriate. For example, the light modulator may instead be configured to use three reflective liquid crystal panels. The light modulator may still instead, for example, be configured to use one liquid crystal panel, three digital mirror devices (DMDs), or one digital mirror device. In the case where only one liquid crystal panel or DMD is used as the light modulator, no members corresponding to the color separation system and a light combining system are required. Further, a configuration including no liquid crystal panel or DMD but capable of modulating light emitted from a light source can be employed as the light modulator.

In each of the aspects described above, the entirety or part of the elements achieved when the processing apparatus 12 executes a program may be achieved by hardware formed, for example, of an FPGA (field programmable gate array), an ASIC (application specific IC), or any other electronic circuit or may be achieved by software and hardware that cooperate with each other. Further, the entirety or part of the elements is identified as an image correction method performed by the projector 10 according to each of the aforementioned aspects.

What is claimed is:

1. An image correction method performed by a projector, the method comprising:
    projecting a second image onto a projection surface, the second image is acquired by reducing a first image containing a plurality of candidate points that are candidates for display position correction to a size that falls within a projection area that is a largest area over which the projector is capable of projection;
    accepting a first input to select a target point that is a display position correction target out of the plurality of candidate points in a state in which the second image is projected on the projection surface;
    projecting a third image onto the projection surface, the third image is acquired by enlarging the second image to a size of the first image after accepting the first input;
    accepting a second input to change a display position of the target point in a state in which the third image is projected on the projection surface; and
    projecting a projection image acquired by correcting a shape of an input image based on the second input onto the projection surface.

2. The image correction method according to claim 1, further comprising:
    determining whether or not any of the plurality of candidate points contained in the first image is located outside the projection area;
    projecting the second image onto the projection surface when it is determined that there is a candidate point located outside the projection area;
    projecting the first image onto the projection surface when it is determined that there is no candidate point located outside the projection area;
    accepting the first input and the second input in a state in which the first image is projected on the projection surface; and
    projecting the projection image onto the projection surface based on the second input.

3. The image correction method according to claim 1, wherein the projecting the second image onto the projection surface includes superimposing the second image on a fourth image acquired by reducing the input image, and
    when the first image is superimposed on the input image, a relationship between a position of a first portion of the input image and a position of a first candidate point out of the plurality of candidate points coincides with a relationship between a position of a portion of the fourth image that is a portion corresponding to the first portion and the position of the first candidate point in the second image.

4. The image correction method according to claim 1, Wherein the projecting the second image onto the projection surface includes reducing the first image in such a way that a second candidate point out of the plurality of candidates points that is located on an outer circumference of the first image and farthest from an outer circumference of the projection area is tangent to the outer circumference of the projection area.

5. The image correction method according to claim 1, Wherein the projecting the second image onto the projection surface includes reducing the first image in accordance with a smaller proportion of a first proportion for a second candidate point out of the plurality of candidate points that is located on an outer circumference of the first image and a second proportion for a third candidate point out of the plurality of candidate points that is located on the outer circumference of the first image,
    the first proportion is a proportion of a length from an intersection of a first line segment and an outer circumference of the projection area to a center of gravity of the projection area to a length of the first line segment, the first line segment connecting the second candidate point to the center of gravity, and
    the second proportion is a proportion of a length from an intersection of a second line segment and the outer circumference of the projection area to the center of gravity to a length of the second line segment, the second line segment connecting the third candidate point to the center of gravity.

6. The image correction method according to claim 1, wherein an auxiliary image that assists the second input is superimposed on the third image.

7. A projector comprising:
    a light source that outputs light;
    a light modulator that modulates the light to generate modulated light;
    a lens that outputs the modulated light; and at least one processing apparatus, wherein the at least one processing apparatus project a second image onto a projection surface by controlling the light modulator, the second image is acquired by reducing a first image containing a plurality of candidate points that are candidates for display position correction to a size that an outer circumference of the first image falls within a projection area that is a largest area over which the projector is capable of projection, accepts a first input to select a target point that is a display position correction target out of the plurality of candidate points in a state in which the second image is projected on the projection surface, project a third image onto the projection surface by controlling the light modulator, the third image is acquired by enlarging the second image to a size of the first image after accepting the first input, accepts a second input to change a display position of the target point in a state in which the third image is projected on the projection surface, and project a projection image acquired by correcting a shape of an input image based on the second input onto the projection surface by controlling the light modulator.

\* \* \* \* \*